(12) United States Patent
Li

(10) Patent No.: US 12,071,882 B2
(45) Date of Patent: Aug. 27, 2024

(54) LOW TEMPERATURE NOx REDUCTION USING H2-SCR FOR DIESEL VEHICLES

(71) Applicant: BASF Corporation, Florham Park, NJ (US)

(72) Inventor: Yuejin Li, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 18/215,855

(22) Filed: Jun. 29, 2023

(65) Prior Publication Data

US 2023/0340898 A1 Oct. 26, 2023

Related U.S. Application Data

(63) Continuation of application No. 16/386,873, filed on Apr. 17, 2019, now Pat. No. 11,732,625, which is a
(Continued)

(51) Int. Cl.
*F01N 3/02* (2006.01)
*B01D 53/90* (2006.01)
(Continued)

(52) U.S. Cl.
CPC .............. *F01N 3/035* (2013.01); *B01D 53/90* (2013.01); *B01D 53/94* (2013.01);
(Continued)

(58) Field of Classification Search
CPC ........ F01N 13/009; F01N 3/021; F01N 3/035; F01N 3/2066; F01N 3/0814;
(Continued)

(56) References Cited

U.S. PATENT DOCUMENTS

| 6,514,905 | B1 | 2/2003 | Hanaki et al. |
| 7,744,840 | B2 * | 6/2010 | Sobolevskiy ...... B01D 53/9418 |
| | | | 422/177 |

(Continued)

FOREIGN PATENT DOCUMENTS

| CN | 105840277 | * | 2/2016 |
| CN | 105840227 | | 8/2016 |

(Continued)

OTHER PUBLICATIONS

Machine Translation CN 105840277 (Year: 2023).*
(Continued)

*Primary Examiner* — Dapinder Singh
(74) *Attorney, Agent, or Firm* — DLA Piper LLP (US)

(57) ABSTRACT

Disclosed herein are emission treatment systems, articles, and methods for selectively reducing NOx compounds. The systems include a hydrogen generator, a hydrogen selective catalytic reduction ($H_2$-SCR) article, and one or more of a diesel oxidation catalyst (DOC) and/or a lean NOx trap (LNT) and/or a low temperature NOx adsorber (LTNA). Certain articles may comprise a zone coated substrate and/or a layered coated substrate and/or an intermingled coated substrate of one or more of the $H_2$-SCR and/or DOC and/or LNT and/or LTNA catalytic compositions.

18 Claims, 9 Drawing Sheets

Related U.S. Application Data continuation of application No. PCT/IB2017/056452, filed on Oct. 17, 2017.

(60) Provisional application No. 62/409,413, filed on Oct. 18, 2016.

(51) Int. Cl.
| | |
|---|---|
| *B01D 53/94* | (2006.01) |
| *F01N 3/021* | (2006.01) |
| *F01N 3/035* | (2006.01) |
| *F01N 3/08* | (2006.01) |
| *F01N 3/10* | (2006.01) |
| *F01N 3/20* | (2006.01) |
| *F01N 13/00* | (2010.01) |

(52) U.S. Cl.
CPC ..... *B01D 53/9418* (2013.01); *B01D 53/9422* (2013.01); *B01D 53/9427* (2013.01); *B01D 53/9477* (2013.01); *F01N 3/021* (2013.01); *F01N 3/0814* (2013.01); *F01N 3/0842* (2013.01); *F01N 3/106* (2013.01); *F01N 3/206* (2013.01); *F01N 3/2066* (2013.01); *F01N 13/009* (2014.06); *B01D 53/9436* (2013.01); *B01D 2251/202* (2013.01); *B01D 2255/102* (2013.01); *B01D 2255/1021* (2013.01); *B01D 2255/1023* (2013.01); *B01D 2255/20738* (2013.01); *B01D 2255/20761* (2013.01); *B01D 2255/50* (2013.01); *B01D 2255/9205* (2013.01); *B01D 2255/9207* (2013.01); *B01D 2258/012* (2013.01); *F01N 2370/00* (2013.01); *F01N 2510/06* (2013.01); *F01N 2610/04* (2013.01); *Y02A 50/20* (2018.01); *Y02T 10/12* (2013.01)

(58) Field of Classification Search
CPC ........ F01N 3/0842; F01N 3/106; F01N 3/206; F01N 2240/30; F01N 2250/02; F01N 2370/00; F01N 2510/06; F01N 2510/0684; F01N 2610/04; B01D 2251/202; B01D 2255/102; B01D 2255/1021; B01D 2255/1023; B01D 2255/20738; B01D 2255/20761; B01D 2255/50; B01D 53/90; B01D 53/94; B01D 53/9418; B01D 53/9422; B01D 53/9427; B01D 53/9477; B01D 53/9436; Y02A 50/20; Y02T 10/12

See application file for complete search history.

(56) References Cited

U.S. PATENT DOCUMENTS

| | | |
|---|---|---|
| 2003/0234011 A1 | 12/2003 | Breuer et al. |
| 2006/0039843 A1 | 2/2006 | Patchett et al. |
| 2007/0012032 A1 | 1/2007 | Hu |
| 2009/0285735 A1 | 11/2009 | Sobolevskiy et al. |
| 2010/0050604 A1* | 3/2010 | Hoard .................. F01N 3/0807 60/301 |
| 2010/0092360 A1 | 4/2010 | Efstathiou |
| 2010/0275584 A1* | 11/2010 | Wada .................... B01J 29/072 60/285 |
| 2011/0070134 A1 | 3/2011 | Stakhev et al. |
| 2014/0271429 A1 | 9/2014 | Kazi et al. |
| 2016/0222852 A1 | 8/2016 | Ren et al. |
| 2018/0038252 A1* | 2/2018 | Yang .................. F01N 13/0097 |

FOREIGN PATENT DOCUMENTS

| | | | |
|---|---|---|---|
| DE | 102012209852 A | 12/2013 | |
| EP | 1541219 A1 | 6/2005 | |
| EP | 1785608 | 4/2009 | |
| EP | 21777257 A1 | 4/2010 | |
| EP | 2233711 | 9/2010 | |
| EP | 2875856 A1 | 5/2015 | |
| FR | 2839340 | 11/2003 | |
| JE | 2001-079402 A | 3/2001 | |
| JP | H06146873 | 5/1994 | |
| JP | 2013-096347 A | 5/2013 | |
| JP | 2015-164729 A | 9/2015 | |
| WO | 2007/063406 A2 | 6/2007 | |
| WO | 2010/121257 A1 | 10/2010 | |
| WO | 2016/154391 A1 | 9/2016 | |
| WO | WO-2016154391 A1 * | 9/2016 | ......... B01D 53/9418 |

OTHER PUBLICATIONS

Office Action from the Chinese Intellectual Property Administration in counterpart application CN201780077449 dated Nov. 17, 2021 (13 pages).

Xinghu, Li, "Exhaust Aftertreatment Technologies for Diesel Vehicles", National Defense Industry Press, p. 116, Jul. 31, 2023, p. 116.

Diesel Engine Management (4$^{th}$ Edition), Beijing Institute of Technology Press, section 29-4, Jan. 1, 2010.

Office Action from the Japanese Patent Office in counterpart application JP 2019-520827, dated Nov. 30, 2021 (13 pages).

Theis, Joseph R. et al., "An assessment of low temperature NOx adsorbers for cold-start NOx control on diesel engines", *Catalysis Today*, Mar. 23, 2015, vol. 258, pp. 367-377; See abstract; and p. 368, lines 22-38.

Extended European Search Report dated Nov. 21, 2023, of counterpart European Patent Application No. 23186240.0.

* cited by examiner

LOW TEMPERATURE NOx REDUCTION USING H2-SCR FOR DIESEL VEHICLES

TECHNICAL FIELD

The present disclosure relates to emission treatment systems and catalytic articles for selectively reducing NOx compounds. Specifically, emission treatment systems comprising a hydrogen selective catalytic reduction article.

BACKGROUND

Diesel engine exhaust is a heterogeneous mixture which contains gaseous, liquid, and solid emissions such as carbon monoxide ("CO"), unburned or partially burned hydrocarbons or oxygenates thereof ("HC") and nitrogen oxides ("NOx"). These emissions are subject to governmental legislation. Therefore, catalyst compositions and substrates on which the compositions are disposed are provided in diesel engine exhaust systems to convert certain or all of these exhaust components to innocuous components and reduce the amount of emissions released to the atmosphere.

Presently two commercial technologies are utilized for diesel NOx control; namely, selective catalytic reduction (SCR) of urea with ammonia and lean NOx trap (LNT). The SCR technology is used in heavy duty and in light duty applications. LNT technology is used exclusively for light duty applications. These technologies achieve high efficiencies at their operating temperature of about 200° C. or higher. However, at a temperature of about 150° C. or lower, also referred to as the "cold start" period, these technologies are relatively inefficient. Additionally, these technologies are vulnerable to sulfur poisoning.

NOx emission levels during cold start may also be controlled through NOx storage (adsorption) and desorption. For example, catalysts may adsorb NOx during the warm-up period and thermally desorb NOx at higher exhaust temperatures. Once higher exhaust temperatures are reached, downstream catalysts that convert NOx compounds to innocuous components can operate relatively efficiently.

With world-wide NOx regulations becoming more stringent and average engine exhaust temperatures ever decreasing, controlling NOx emissions with current technologies is becoming more and more challenging. Accordingly, there is a need in the art to identify more effective NOx reduction technologies that are more sulfur tolerant and that may be sufficiently effective during cold start operations, i.e., at temperatures of about 150° C. and lower, to meet future stringent regulations.

SUMMARY

In some embodiments, the present disclosure is directed to an emission treatment system for selectively reducing NOx compounds, the system comprising: a hydrogen generator; and a catalytic article. The catalytic article comprising a substrate having a zoned catalytic coating thereon. The zoned catalytic coating comprising an upstream zone comprising an $H_2$-SCR catalyst composition and a downstream zone comprising a diesel oxidation catalyst (DOC) composition. In other embodiments, the catalytic article may comprise a substrate having a layered catalytic coating thereon. The layered catalytic coating comprising a bottom layer comprising a DOC composition and an upper layer comprising an $H_2$-SCR composition. In yet other embodiments, the catalytic article may comprise a substrate having an intermingled catalytic coating thereon. The intermingled catalytic coating comprising a DOC composition and an $H_2$-SCR composition. In certain embodiments, the catalytic article may comprise a substrate having a catalytic coating which combines two or more of the zoned, layered, or intermingled arrangements. The hydrogen generator may be positioned in fluid communication and upstream from the catalytic article.

In some embodiments, the emission treatment system may comprise a separate $H_2$-SCR catalytic article comprising a substrate and an $H_2$-SCR catalyst composition; and a separate DOC catalytic article comprising a substrate and a DOC composition. The separate $H_2$-SCR and DOC catalytic articles may be incorporated in the system as alternatives to a single catalytic article with zoned catalytic coating comprising both a DOC and an $H_2$-SCR zone. When the $H_2$-SCR catalytic article and the DOC catalytic article are separate, they may be positioned in a fluid communication with each other such that the DOC catalytic article is downstream of the $H_2$-SCR catalytic article. The hydrogen generator may be positioned in fluid communication and upstream from the $H_2$-SCR catalytic article.

In some embodiments, the present disclosure is directed to an emission treatment system for selectively reducing NOx compounds, the system comprising a hydrogen generator; an $H_2$-SCR catalytic article comprising a substrate and an $H_2$-SCR catalyst composition; and a lean NOx trap (LNT) catalytic article comprising a substrate and a LNT catalyst composition, the LNT catalytic article in fluid communication and downstream of the $H_2$-SCR catalytic article, and the hydrogen generator in fluid communication and upstream of the $H_2$-SCR catalytic article.

In some embodiments, the present disclosure is directed to a catalytic article comprising: a substrate having a zoned catalytic coating thereon, wherein the zoned catalytic coating comprises: an upstream zone comprising an $H_2$-SCR catalyst composition; and a downstream zone comprising a diesel oxidation catalyst (DOC) composition. In other embodiments, the catalytic article may comprise a substrate having a layered catalytic coating thereon. The layered catalytic coating comprising a bottom layer comprising a DOC composition and an upper layer comprising an $H_2$-SCR composition. In yet other embodiments, the catalytic article may comprise a substrate having an intermingled catalytic coating thereon. The intermingled catalytic coating comprising a DOC composition and an $H_2$-SCR composition. In certain embodiments, the catalytic article may comprise a substrate having a catalytic coating which combines two or more of the zoned, layered, or intermingled arrangements.

In some embodiments, the present disclosure is directed to a method for treating an exhaust stream containing NOx, comprising passing the exhaust stream through an emission treatment system or through a catalytic article disclosed herein.

In some embodiments, the emission treatment systems and/or catalytic articles may further comprise a low temperature NOx adsorbent (LTNA).

In various embodiments where zone coating is used, the upstream zone can overlay a portion of the downstream zone or the downstream zone can overlay a portion of the upstream zone. In some cases, the upstream and the downstream zones are adjacent and do not overlay each other.

Where the LTNA composition is combined with either the $H_2$-SCR composition or the DOC composition, the two compositions can be in direct contact. Where the DOC composition is combined with the $H_2$-SCR composition, the two compositions can be in direct contact.

In various embodiments combining the $H_2$-SCR composition with the DOC composition, the $H_2$-SCR catalyst composition can extend the entire length of the substrate and the DOC composition can overlay a portion of the $H_2$-SCR composition. Alternatively, the $H_2$-SCR catalyst composition can extend the entire length of the substrate and the $H_2$-SCR composition can overlay the DOC composition. In other embodiments, the DOC catalyst composition can extend the entire length of the substrate and the $H_2$-SCR composition can overlay a portion of the DOC composition. Alternatively, the DOC catalyst composition can extend the entire length of the substrate and the DOC composition can overlay the $H_2$-SCR composition.

The present disclosure includes, without limitation, the following embodiments.

Embodiment 1: An emission treatment system for selectively reducing NOx compounds, the system comprising: a hydrogen generator; and an $H_2$-SCR catalytic article comprising a substrate and an $H_2$-SCR catalyst composition, the hydrogen generator being in fluid communication with, and upstream of, the $H_2$-SCR catalytic article; and at least one of (a) a diesel oxidation catalyst (DOC) catalyst composition; and (b) a lean NOx trap (LNT) composition, wherein when the LNT composition is present, the system comprises a lean NOx trap (LNT) catalytic article comprising a substrate and the LNT catalyst composition, the LNT catalytic article in fluid communication with, and downstream of, the $H_2$-SCR catalytic article, and wherein when the DOC catalyst composition is present, the DOC catalyst composition is either (1) present in a zoned catalyst coating on the $H_2$-SCR catalytic article with an upstream zone comprising the $H_2$-SCR catalyst composition and a downstream zone comprising the DOC catalyst composition; (2) present in an intermingled catalyst coating on the $H_2$-SCR catalytic article comprising the DOC catalyst composition and the $H_2$-SCR catalyst composition; (3) present in a layered catalyst coating on the $H_2$-SCR catalytic article with a bottom layer comprising the DOC catalyst composition and an upper layer comprising the $H_2$-SCR catalyst composition, or (4) present on a separate DOC catalytic article comprising a substrate and the DOC catalyst composition, the DOC catalytic article in fluid communication with, and downstream of, the $H_2$-SCR catalytic article.

Embodiment 2: The emission treatment system of any preceding embodiment, further comprises a low temperature NOx adsorbent (LTNA) catalyst composition present in either the zoned catalyst coating, the intermingled catalyst coating, or the layered catalyst coating, or present on the $H_2$-SCR catalytic article upstream from the separate DOC catalytic article, or present on the separate DOC catalytic article.

Embodiment 3: The emission treatment system of any preceding embodiment, wherein, in the zoned catalyst coating, the LTNA catalyst composition is incorporated into the upstream zone comprising the $H_2$-SCR catalyst composition, incorporated into the downstream zone comprising the DOC composition, or positioned in a middle zone between the upstream zone comprising the $H_2$-SCR catalyst composition and the downstream zone comprising the DOC composition.

Embodiment 4: The emission treatment system of any preceding embodiment, further comprising a low temperature NOx adsorbent (LTNA) catalytic article comprising a substrate and a LTNA catalyst composition, the LTNA catalytic article in fluid communication with the $H_2$-SCR catalytic article and the hydrogen generator.

Embodiment 5: The emission treatment system of any preceding embodiment, wherein the LTNA catalytic article is positioned downstream from the $H_2$-SCR catalytic article or positioned upstream from the $H_2$-SCR catalytic article and the hydrogen generator.

Embodiment 6: The emission treatment system of any preceding embodiment, wherein the order of catalytic articles from upstream to downstream is $H_2$-SCR catalytic article, LTNA catalytic article, and DOC catalytic article.

Embodiment 7: The emission treatment system of any preceding embodiment, wherein the order of catalytic articles from upstream to downstream is $H_2$-SCR catalytic article, DOC catalytic article, and LTNA catalytic article.

Embodiment 8: The emission treatment system of any preceding embodiment, wherein the order of catalytic articles from upstream to downstream is LTNA catalytic article, $H_2$-SCR catalytic article, and DOC catalytic article.

Embodiment 9: The emission treatment system of any preceding embodiment, further comprising a catalytic soot filter (CSF); a selective catalytic reduction (SCR) catalyst; an ammonia oxidation catalyst (AMOX); or combinations thereof.

Embodiment 10: The emission treatment system of any preceding embodiment, wherein the SCR catalyst comprises a base metal-containing 8-ring small pore molecular sieve.

Embodiment 11: The emission treatment system of any preceding embodiment, wherein the SCR catalyst comprises an iron- and/or copper-containing 8-ring small pore molecular sieve.

Embodiment 12: The emission treatment system of any preceding embodiment, wherein the molecular sieve is a zeolite having a structure selected from the group consisting of AEI, AFT, AFX, CHA, EAB, ERI, KFI, LEV, SAS, SAT, and SAV.

Embodiment 13: The emission treatment system of any preceding embodiment, wherein the molecular sieve has a CHA crystal structure.

Embodiment 14: The emission treatment system of any preceding embodiment, wherein the hydrogen generator is selected from the group consisting of on board hydrogen, hydrogen produced from alcohol reforming, hydrogen produced from ammonia decomposition, hydrogen produced from fuel reforming, and combinations thereof.

Embodiment 15: The emission treatment system of any preceding embodiment, wherein the LNT catalyst composition comprises a NOx sorbent and a platinum group metal component dispersed on a refractory metal oxide support.

Embodiment 16: The emission treatment system of any preceding embodiment, wherein the $H_2$-SCR catalytic article is close coupled.

Embodiment 17: The emission treatment system of any preceding embodiment, wherein the $H_2$-SCR catalyst composition comprises a platinum group metal component supported on a metal oxide or zeolite support.

Embodiment 18: The emission treatment system of any preceding embodiment, wherein the platinum group metal component is platinum, palladium, or a combination thereof.

Embodiment 19: The emission treatment system of any preceding embodiment, wherein the platinum group metal component is supported on a hydrogen form of zeolite or a metal oxide selected from the group consisting of zirconia, titania, magnesia, and combinations thereof.

Embodiment 20: A catalytic article comprising: a substrate having a catalytic coating thereon comprising an $H_2$-SCR catalyst composition and, optionally, a diesel oxidation catalyst (DOC) composition, wherein the $H_2$-SCR catalyst composition comprises a platinum group metal component supported on a metal oxide or zeolite support.

Embodiment 21: The catalytic article of any preceding embodiment, comprising either (1) a layered catalytic coating comprising a bottom layer comprising the DOC composition and an upper layer comprising the $H_2$-SCR composition; or (2) a zoned catalytic coating comprising an upstream zone comprising the $H_2$-SCR catalyst composition and a downstream zone comprising the DOC composition; or (3) an intermingled catalytic coating comprising the $H_2$-SCR composition and the DOC composition.

Embodiment 22: The catalytic article of any preceding embodiment, wherein the platinum group metal component is platinum, palladium, or a combination thereof.

Embodiment 23: The catalytic article of any preceding embodiment, wherein the platinum group metal component is supported on a hydrogen form of zeolite or a metal oxide selected from the group consisting of zirconia, titania, magnesia, and combinations thereof.

Embodiment 24: The catalytic article of any preceding embodiment, wherein the zoned catalytic coating further comprises a low temperature NOx adsorbent (LTNA) catalyst composition zone, wherein the LTNA catalyst composition zone is incorporated into the upstream zone comprising the $H_2$-SCR catalyst composition, or the LTNA catalyst composition zone is incorporated into the downstream zone comprising the DOC composition, or the LTNA catalyst composition zone is positioned in a middle zone between the upstream zone comprising the $H_2$-SCR catalyst composition and the downstream zone comprising the DOC composition.

Embodiment 25: The catalytic article of any preceding embodiment, wherein the layered catalytic coating further comprises a LTNA catalyst composition layer.

Embodiment 26: The catalytic article of any preceding embodiment, wherein the intermingled catalytic coating further comprises a LTNA catalyst composition.

Embodiment 27: A method for treating an exhaust stream containing NOx, comprising passing the exhaust stream through the emission treatment system of any preceding embodiment.

Embodiment 28: The method of any preceding embodiment, wherein the exhaust stream has a temperature that is about 200° C. or lower, about 175° C. or lower, about 150° C. or lower, about 125° C. or lower, or about 100° C. or lower.

Embodiment 29: A method for treating an exhaust stream containing NOx, comprising: introducing hydrogen gas into the exhaust stream (such as an exhaust stream from a lean burn engine such as a diesel engine) to form a hydrogen-treated exhaust stream; passing the hydrogen-treated exhaust stream through an emission treatment system comprising an $H_2$-SCR catalytic article comprising a substrate and an $H_2$-SCR catalyst composition, wherein the $H_2$-SCR catalyst composition comprises a platinum group metal component supported on a metal oxide or zeolite support.

Embodiment 30: The method of any preceding embodiment, wherein the platinum group metal component is platinum, palladium, or a combination thereof.

Embodiment 31: The method of any preceding embodiment, wherein the platinum group metal component is supported on a hydrogen form of zeolite or a metal oxide selected from the group consisting of zirconia, titania, magnesia, and combinations thereof.

These and other features, aspects, and advantages of the disclosure will be apparent from a reading of the following detailed description together with the accompanying drawings, which are briefly described below. The present disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE DRAWINGS

The above and other features of the present disclosure, their nature, and various advantages will become more apparent upon consideration of the following detailed description, taken in conjunction with the accompanying drawings, in which.

DEFINITIONS AND MEASUREMENTS

The term "catalytic article" refers to an element that is used to promote a desired reaction. The present catalytic articles comprise a substrate having a catalytic coating disposed thereon.

The term "exhaust stream" or "exhaust gas stream" refers to any combination of flowing gas that may contain solid or liquid particulate matter. The stream comprises gaseous components and is for example exhaust of a lean burn engine, which may contain certain non-gaseous components such as liquid droplets, solid particulates and the like. An exhaust stream of a lean burn engine typically further comprises combustion products, products of incomplete combustion, oxides of nitrogen, combustible and/or carbonaceous particulate matter (soot) and un-reacted oxygen and/or nitrogen.

The term "catalyst" refers to a material that promotes a chemical reaction. The catalyst includes the "catalytically active species" and the "carrier" that carries or supports the active species. For example, molecular sieves including zeolites are carriers/supports for present copper and iron active catalytic species. Likewise, refractory metal oxide particles may be a carrier for platinum group metal catalytic species.

The term "in fluid communication" is used to refer to articles positioned on the same exhaust line, i.e., a common exhaust stream passes through articles that are in fluid communication with each other. Articles in fluid communication may be adjacent to each other in the exhaust line. Alternatively, articles in fluid communication may be separated by one or more articles, also referred to as "bricks."

The inlet end of a substrate is synonymous with the "upstream" end or "front" end. The outlet end is synonymous with the "downstream" end or "rear" end. An upstream zone is upstream of a downstream zone. An upstream zone may be closer to the engine or manifold, and a downstream zone may be further away from the engine or manifold.

"Platinum group metal components" (PGM) refer to platinum group metals or compounds thereof, for example or one of their oxides. "Rare earth metal components" refer to one or more oxides of the lanthanum series defined in the Periodic Table of Elements, including lanthanum, cerium, praseodymium and neodymium.

Weight percent (wt %), if not otherwise indicated, is based on an entire composition free of any volatiles, that is, based on solids content.

The term "NOx" refers to nitrogen oxide compounds, such NO and $NO_2$.

DETAILED DESCRIPTION

The present disclosure relates to emission treatment systems, catalytic articles, and methods for selectively reducing NOx compounds. The systems have an upstream $H_2$-SCR catalytic article and downstream catalytic articles that may include one or more of a DOC, LNT, LTNA, SCR, SCR on filter (SCRoF), catalytic soot filter (CSF), and ammonia oxidation catalyst (AMOX).

Figure 1:
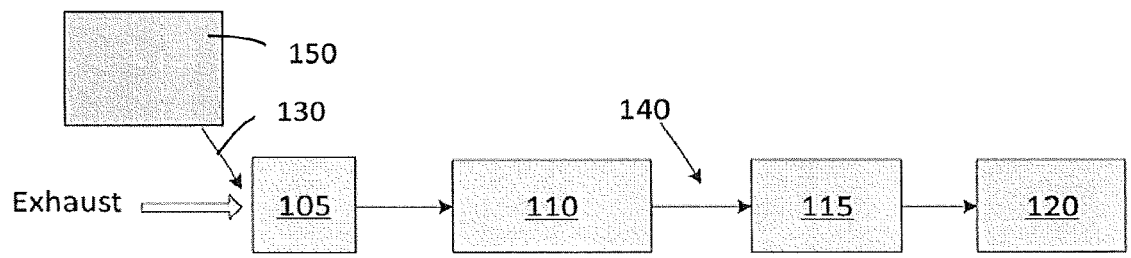
FIG. 1 illustrates an emission treatment system according to an embodiment of the invention where the $H_2$-SCR and the DOC catalysts are combined in a single catalytic article.
Figure 2:
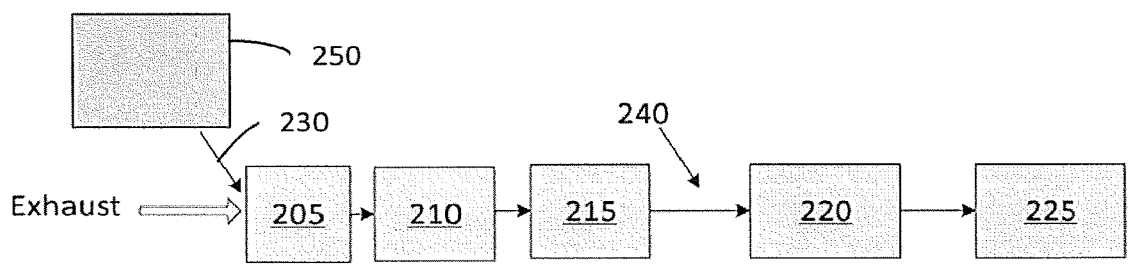
FIG. 2 illustrates an emission treatment system according to an embodiment of the invention where the $H_2$-SCR and the DOC catalytic articles are separate.
Figure 3:
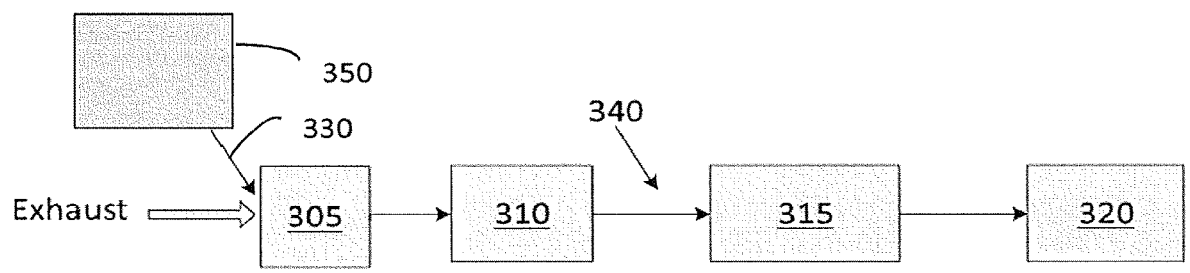
FIG. 3 illustrates an emission treatment system according to an embodiment of the invention comprising an $H_2$-SCR article and a LNT article.

FIGS. 1-3 describe three different embodiments of the invention. The various embodiments include a hydrogen generator (150, 250, 350) and a $H_2$-SCR, such that the hydrogen generator produces an effective amount of hydrogen to selectively reduce the NOx compounds level by about 5% or more, about 10% or more, about 20% or more, about 30% or more, about 40% or more, about 50% or more, about 60% or more, about 70% or more, about 80% or more, or about 90% or more.

Hydrogen Generator

The hydrogen generator could vary and may be selected from the group consisting of on-board hydrogen, hydrogen produced from alcohol reforming, hydrogen produced from ammonia decomposition, hydrogen produced from hydrocarbon reforming, and mixtures thereof.

Generating hydrogen from on-board hydrogen may require a hydrogen storage on board.

Generating hydrogen from alcohol reforming may require alcohol storage on board. Suitable alcohols include but are not limited to ethanol and methanol. The alcohol storage may by connected to a reforming catalyst which could catalytically reform the ethanol and/or methanol and/or other suitable alcohol to hydrogen.

Generating hydrogen from ammonia decomposition may require on-board urea storage. On-board urea storage already exists and is utilized to inject urea into the exhaust stream right before the SCR catalytic article placement. Thus, a single on-board urea storage may be employed for different purposes. One purpose could be the urea injection into the exhaust stream prior to SCR placement. The other purpose could be a urea injection used to decompose ammonia and generate hydrogen in the exhaust stream prior to the $H_2$-SCR catalytic article placement.

Hydrogen may also be generated from hydrocarbon reforming. The diesel fuel storage may be connected to a reforming catalyst which could catalytically reform hydrocarbons in the diesel fuel to hydrogen. This hydrogen generator may be more challenging than other hydrogen generators described due to the diversity of hydrocarbons in the fuel.

It is to be understood that the present invention encompasses various hydrogen generators and that the above list is exemplary and is not intended to be limiting.

Emission Treatment Systems and Articles

FIG. 1 illustrates an emission treatment system for selectively reducing NOx compounds according to an embodiment. The system comprising: a hydrogen generator 150; and a catalytic article 105. The hydrogen generator may be selected from the hydrogen generators described previously and may be associated with a reservoir, a pump, and an injector 130 positioned upstream from the catalytic article 105 and in fluid communication with catalytic article 105.

Catalytic article 105 may comprise a substrate having a zoned catalytic coating thereon. The zoned catalytic coating may comprise an upstream zone comprising an $H_2$-SCR catalyst composition and a downstream zone comprising a DOC composition.

In certain embodiments, catalytic article 105 may comprise a substrate having a layered catalytic coating thereon. The layered catalytic coating may comprise a bottom layer comprising a DOC composition and an upper layer comprising an $H_2$-SCR catalytic article.

In other embodiments, catalytic article 105 may comprise a substrate having an intermingled catalytic coating thereon. The intermingled catalytic coating may comprise a DOC composition and an $H_2$-SCR composition.

In yet other embodiments, catalytic article 105 may comprise a substrate having a catalytic coating comprising two or more of the following arrangements: zoned catalytic coating, layered catalytic coating, intermingled catalytic coating, and combinations thereof.

Catalytic article 105 may further comprise a LTNA. The LTNA functionality may be part of the DOC composition, part of the $H_2$-SCR catalyst composition, part of both the DOC composition and the $H_2$-SCR catalyst composition, separate from the DOC composition and from the $H_2$-SCR catalyst composition, or combinations thereof. For instance, the LTNA may be incorporated into an upstream zone comprising the $H_2$-SCR catalyst composition, into the downstream zone comprising the DOC composition, into both the upstream zone and the downstream zone, positioned in a middle zone between an upstream zone and a downstream zone, or combinations thereof. Another example is where the LTNA is incorporated into a bottom DOC composition layer, into a top $H_2$-SCR catalyst composition layer, into both bottom and top layers, into an interlayer between the bottom and top layer, or combinations thereof. In yet another example, the LTNA may be intermingled with other components of the catalytic article.

Figure 16:
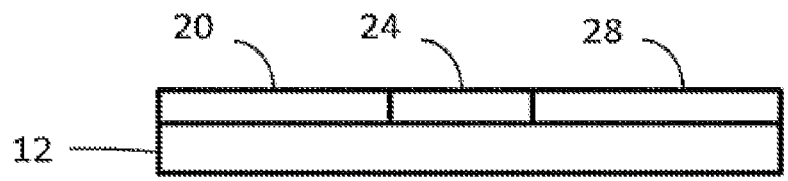
FIG. 16 shows a cross-sectional view of a substrate having a zoned catalytic layer.

In some embodiments, the upstream zone, comprising the $H_2$-SCR catalyst composition (with or without LTNA functionality), overlays a portion of the downstream zone, comprising the DOC composition (with or without LTNA functionality). For instance, the $H_2$-SCR zone may extend from the inlet end toward the outlet end extending about 10%, about 20%, about 30%, about 40%, about 50%, about 60%, about 70%, about 80% or about 90% of the substrate length, while the DOC zone may extend from the outlet end towards the inlet end extending about 10%, about 20%, about 30%, about 40%, about 50%, about 60%, about 70%, about 80% or about 90% of the substrate length. The upstream and the downstream zones may be adjacent and not overlay each other. Alternatively, the $H_2$-SCR upstream zone and the DOC downstream zone may overlay each other, forming a third "middle" zone. The middle zone may for example extend from about 5% to about 80% of the substrate length, for example about 5%, about 10%, about 20%, about 30%, about 40%, about 50%, about 60%, about 70%, or about 80% of the substrate length. A cross-sectional view of a zoned catalytic layer on a substrate is shown in FIG. 16, where three zones are shown as part of a coating layer on a substrate 12, including an upstream zone 20, an optional middle zone 24, and a downstream zone 28.

The $H_2$-SCR and DOC zones may be in direct contact with each other without a "middle" overlapping zone. Alternatively, the $H_2$-SCR and DOC zones may not be in direct contact, forming a "gap" between the two zones. In the case of an "undercoat" or "overcoat" the gap between the SCR and LNT zones is termed an "interlayer."

In certain embodiments, the $H_2$-SCR (with or without LTNA functionality) catalyst composition extends the entire length of the substrate and the DOC composition (with or without LTNA functionality) overlays a portion of the $H_2$-SCR composition. In other embodiments, the $H_2$-SCR catalyst composition (with or without LTNA functionality) extends the entire length of the substrate and the $H_2$-SCR composition overlays the DOC composition (with or without LTNA functionality). For example, the DOC zone may extend from the outlet end towards the inlet end about 10%, about 20%, about 30%, about 40%, about 50%, about 60%, about 70% or about 80% of the substrate length.

In certain embodiments, the DOC catalyst composition (with or without LTNA functionality) extends the entire length of the substrate and the $H_2$-SCR composition (with or without LTNA functionality) overlays a portion of the DOC composition. In other embodiments, the DOC catalyst composition (with or without LTNA functionality) extends the entire length of the substrate and the DOC composition overlays the $H_2$-SCR composition (with or without LTNA functionality). For example, the $H_2$-SCR zone may extend from the inlet end towards the outlet end about 10%, about 20%, about 30%, about 40%, about 50%, about 60%, about 70% or about 80% of the substrate length.

In certain embodiments, a separate LTNA catalytic article comprising a substrate comprising a LTNA catalyst composition may be positioned in fluid communication with the catalytic article comprising both a DOC composition (with or without LTNA functionality) and $H_2$-SCR composition (with or without LTNA functionality). The LTNA catalytic article may be located upstream or downstream of the catalytic article. If the LTNA is positioned upstream of the catalytic article, it may also be positioned upstream of the hydrogen generator, as the hydrogen generator is preferably located immediately prior to the $H_2$-SCR catalyst composition. The LTNA may also be in fluid communication with other components of the emission treatment system, for example, with the hydrogen generator.

The present zones are defined by the relationship of the $H_2$-SCR and DOC catalytic coatings. With respect to $H_2$-SCR and DOC catalytic coatings, there are only an upstream and a downstream zone or there may be an upstream zone, a middle zone and a downstream zone. Where the $H_2$-SCR and DOC catalytic coatings are adjacent and do not overlap, there are only upstream and downstream zones. Where the $H_2$-SCR and DOC coatings overlap to a certain degree, there are upstream, downstream and middle zones. Where for example, a $H_2$-SCR zone extends the entire length of the substrate and the DOC zone extends from the outlet end a certain length and overlays or underlays a portion of the SCR zone, there are only upstream and downstream zones.

The $H_2$-SCR and DOC zones may be in direct contact with the substrate. Alternatively, one or more "undercoats" may be present, so that at least a portion of the $H_2$-SCR and DOC zones are not in direct contact with the substrate (but rather with the undercoat). One or more "overcoats" may also be present, so that at least a portion of the $H_2$-SCR and DOC zones are not directly exposed to a gaseous stream or atmosphere (but rather are in contact with the overcoat).

The interlayer(s), undercoat(s) and overcoat(s) may contain one or more catalysts or may be free of catalysts.

The catalytic coatings present in the combined $H_2$-SCR/DOC catalytic article may comprise more than one identical layers.

FIG. 2 illustrates an emission treatment system comprising a separate $H_2$-SCR catalytic article 205 and a separate DOC catalytic article 210 instead of a single catalytic article with a catalytic coating comprising both a DOC composition and an $H_2$-SCR catalyst composition as illustrated in FIG. 1. $H_2$-SCR catalytic article 205 comprising a substrate and an $H_2$-SCR catalyst composition. DOC catalytic article 210 comprising a substrate and a DOC composition. When $H_2$-SCR catalytic article 205 and DOC catalytic article 210 are separate, they may be positioned in a fluid communication with each other such that the DOC catalytic article is downstream of the $H_2$-SCR catalytic article. Similarly to FIG. 1, any of the hydrogen generators 250 described previously may be included in the system. The hydrogen generator may be associated with a reservoir, a pump, and an injector 230 positioned upstream from $H_2$-SCR catalytic article 205 and in fluid communication with $H_2$-SCR catalytic article 205.

The emission treatment system of FIG. 2 may further comprise a separate LTNA catalytic article (not shown). The LTNA catalytic article may comprise a substrate and a LTNA catalyst composition. The LTNA catalytic article may be in fluid communication with other components of the emission treatment system, for example, the $H_2$-SCR catalytic article, the DOC catalytic article, and the hydrogen generator. The order of the articles may vary. For instance, the order from upstream to downstream may be $H_2$-SCR catalytic article, LTNA catalytic article, and DOC catalytic article. Alternatively, the order from upstream to downstream may be $H_2$-SCR catalytic article, DOC catalytic article, and LTNA catalytic article. In some embodiments, the order from upstream to downstream may be LTNA catalytic article, $H_2$-SCR catalytic article, and DOC catalytic article. In certain embodiments, the $H_2$-SCR catalytic article and/or the DOC catalytic article present in the emission treatment system of FIG. 2, include a LTNA catalyst composition as an added LTNA functionality to either or both articles. For instance, an $H_2$-SCR catalytic article with LTNA functionality may comprise a zoned $H_2$-SCR catalyst composition and LTNA catalyst composition, a layered $H_2$-SCR catalyst composition and LTNA catalyst composition, an intermingled $H_2$-SCR catalyst composition and LTNA catalyst composition, or combinations thereof. Similarly, a DOC catalytic article with LTNA functionality may comprise a zoned DOC catalyst composition and LTNA catalyst composition, a layered DOC catalyst composition and LTNA catalyst composition, an intermingled DOC catalyst composition and LTNA catalyst composition, or combinations thereof.

In zone catalytic coatings, the upstream zone may overlay a portion of the downstream zone or the downstream zone may overlay a portion of the upstream zone as described above for the DOC and $H_2$-SCR catalytic article. Alternatively, the upstream and the downstream zones may be adjacent (either in direct contact or with a gap in the middle) and not overlay each other.

In layered catalytic coatings, a first layer may extend the entire length of the substrate and a subsequent layer may overlay a portion of the first layer. For instance, for $H_2$-SCR and LTNA layered catalytic coating, in one embodiment, the $H_2$-SCR catalyst composition may extend the entire length of the substrate and the LTNA catalyst composition may overlay the $H_2$-SCR composition entirely or overlay a portion of the $H_2$-SCR composition. In another embodiment, the $H_2$-SCR catalyst composition may extend the entire length of the substrate and the $H_2$-SCR composition may overlay the LTNA composition entirely or overlay a portion of the LTNA composition.

For DOC and LTNA layered catalytic coating, in one embodiment, the DOC catalyst composition may extend the entire length of the substrate and the LTNA catalyst composition may overlay the DOC composition entirely or overlay a portion of the DOC composition. In another embodiment, the DOC catalyst composition may extend the entire length of the substrate and the DOC composition may overlay the LTNA composition entirely or overlay a portion of the LTNA composition.

FIG. 3 illustrates an emission treatment system comprising a hydrogen generator 350; an $H_2$-SCR catalytic article 305 and a lean NOx trap (LNT) catalytic article 310. The $H_2$-SCR catalytic article 305 comprising a substrate and an $H_2$-SCR catalyst composition. The LNT catalytic article 310 comprising a substrate and a LNT catalyst composition. LNT catalytic article 310 may be positioned in fluid communication and downstream of $H_2$-SCR catalytic article 305. Similarly to FIGS. 1 and 2, any of the hydrogen generators 350 described previously for producing hydrogen may be included in the system. The hydrogen generator may be associated with a reservoir, a pump, and an injector 330 positioned upstream from $H_2$-SCR catalytic article 305 and in fluid communication with $H_2$-SCR catalytic article 305.

The emission treatment systems according to any of the embodiments disclosed herein may further comprise a soot filter and/or a selective catalytic reduction (SCR) catalyst and/or SCR on filter (SCRoF) and/or an ammonia oxidation catalyst (AMOX) and/or combinations thereof. The soot filter may be uncatalyzed or may be catalyzed (CSF). For instance, FIG. 1 depicts, from upstream to downstream, combined $H_2$-SCR/DOC catalytic article 105, a CSF catalytic article 110, an SCR catalytic article 115 and a combined catalytic article 120 comprising both SCR and AMOX, all in fluid communication with each other. Another example is FIG. 2, which depicts, from upstream to downstream, a $H_2$-SCR catalytic article 205, a DOC catalytic article 210, a CSF catalytic article 215, a SCR catalytic article 220 and a combined catalytic article 225 comprising both SCR and AMOX, all in fluid communication with each other. Yet another example is FIG. 3, which depicts, from upstream to downstream, a $H_2$-SCR catalytic article 305, a LNT catalytic article 310, an SCR on filter catalytic article 315, and an optional SCR catalytic article 320, all in fluid communication with each other. These systems may be referred to as "multi-brick" systems, where a "brick" may refer to a single article, such as a $H_2$-SCR, or a DOC, or a CSF, or a LNT, or an AMOX, etc.

Various zoned and layered combinations of catalyst compositions are envisioned in this disclosure. For example, the $H_2$-SCR catalytic article can comprise a zoned $H_2$-SCR catalyst composition and LTNA catalyst composition, a layered $H_2$-SCR catalyst composition and LTNA catalyst composition, an intermingled $H_2$-SCR catalyst composition and LTNA catalyst composition, or combinations thereof. In addition, the DOC catalytic article can comprise a zoned DOC catalyst composition and LTNA catalyst composition, a layered DOC catalyst composition and LTNA catalyst composition, an intermingled DOC catalyst composition and LTNA catalyst composition, or combinations thereof.

In one embodiment, the $H_2$-SCR catalytic article comprises a combination of a zoned $H_2$-SCR catalyst composition and LTNA catalyst composition located on an upstream and a downstream zone and a layered $H_2$-SCR catalyst composition and LTNA catalyst composition located on a bottom layer and a top layer, and wherein the upstream zone overlays a portion of the downstream zone.

In another embodiment, the $H_2$-SCR catalytic article comprises a combination of a zoned $H_2$-SCR catalyst composition and LTNA catalyst composition located on an upstream and a downstream zone and a layered $H_2$-SCR catalyst composition and LTNA catalyst composition located on a bottom layer and a top layer, and wherein the downstream zone overlays a portion of the upstream zone.

In certain embodiments, the DOC catalytic article comprises a combination of a zoned DOC catalyst composition and LTNA catalyst composition located on an upstream and a downstream zone and a layered DOC catalyst composition and LTNA catalyst composition located on a bottom layer and a top layer, and wherein the upstream zone overlays a portion of the downstream zone.

In another embodiment, the DOC catalytic article comprises a combination of a zoned DOC catalyst composition and LTNA catalyst composition located on an upstream and a downstream zone and a layered DOC catalyst composition and LTNA catalyst composition located on a bottom layer and a top layer, and wherein the downstream zone overlays a portion of the upstream zone.

In yet another embodiment, the $H_2$-SCR catalytic article comprises a combination of a zoned $H_2$-SCR catalyst composition and LTNA catalyst composition and a layered $H_2$-SCR catalyst composition and LTNA catalyst composition, and wherein the $H_2$-SCR catalyst composition extends the entire length of the substrate and the LTNA catalyst composition overlays a portion of the $H_2$-SCR composition.

In still further embodiments, the $H_2$-SCR catalytic article comprises a layered $H_2$-SCR catalyst composition and LTNA catalyst composition, and wherein the $H_2$-SCR catalyst composition extends the entire length of the substrate and the $H_2$-SCR composition overlays the LTNA composition.

In another embodiment, the $H_2$-SCR catalytic article comprises a combination of a zoned $H_2$-SCR catalyst composition and LTNA catalyst composition and a layered $H_2$-SCR catalyst composition and LTNA catalyst composition, and wherein the $H_2$-SCR catalyst composition extends the entire length of the substrate and the $H_2$-SCR composition overlays a portion of the LTNA composition.

In other embodiments, the $H_2$-SCR catalytic article comprises a layered $H_2$-SCR catalyst composition and LTNA catalyst composition, and wherein the $H_2$-SCR catalyst composition extends the entire length of the substrate and the LTNA composition overlays the $H_2$-SCR composition.

In certain embodiments, the DOC catalytic article comprises a combination of a zoned DOC catalyst composition and LTNA catalyst composition and a layered DOC catalyst composition and LTNA catalyst composition, and wherein the DOC catalyst composition extends the entire length of the substrate and the LTNA catalyst composition overlays a portion of the DOC composition.

In other embodiments, the DOC catalytic article comprises a layered DOC catalyst composition and LTNA catalyst composition, and wherein the DOC catalyst composition extends the entire length of the substrate and the DOC composition overlays the LTNA composition.

In still further embodiments, the DOC catalytic article comprises a combination of a zoned DOC catalyst composition and LTNA catalyst composition and a layered DOC catalyst composition and LTNA catalyst composition, and wherein the DOC catalyst composition extends the entire length of the substrate and the DOC composition overlays a portion of the LTNA composition.

In yet further embodiments, the DOC catalytic article comprises a layered DOC catalyst composition and LTNA catalyst composition, and wherein the DOC catalyst composition extends the entire length of the substrate and the LTNA composition overlays the DOC composition.

In certain embodiments, the $H_2$-SCR catalytic article comprises a zoned $H_2$-SCR catalyst composition and LTNA catalyst composition located on an upstream and downstream zone, and wherein the upstream and the downstream zones are adjacent and do not overlay each other.

In certain embodiments, the DOC catalytic article comprises a zoned DOC catalyst composition and LTNA catalyst composition located on an upstream and downstream zone, and wherein the upstream and the downstream zones are adjacent and do not overlay each other.

The order of the various components may vary and is not to be construed as limiting. It is understood, however, that a hydrogen injection produced from a hydrogen generator will be positioned upstream from the $H_2$-SCR catalytic article and in fluid communication with the $H_2$-SCR catalytic article. It is also understood, that SCR catalysts operate in the presence of a reductant, for example, ammonia or urea, and that this reductant will be injected upstream from the corresponding SCR article and in fluid communication with the corresponding SCR article (see reductant injection 140, 240, and 340 in FIGS. 1, 2, and 3, respectively).

It is also believed that positioning the $H_2$-SCR article prior to the LNT article or prior to the DOC article will provide optimal performance, particularly during cold start operations. The $H_2$-SCR article may be operational at lower temperature, observed during cold start operations. The $H_2$-SCR article may generate heat during its operation, thereby raising the temperature of the exhaust gas to values that would improve the operations of the LNT and DOC catalytic articles. In some embodiments, the $H_2$-SCR catalytic article may be positioned prior and immediately adjacent to the LNT or DOC catalytic articles. Alternatively, there may be one or more additional articles (bricks) positioned between the $H_2$-SCR catalytic article and the LNT or DOC catalytic articles.

In some embodiments, the $H_2$-SCR article, whether combined with a DOC or not, may be placed in close coupled position located near the engine's exhaust outlet or exhaust manifold, for example, within about 12 inches of the exhaust outlet or exhaust manifold outlet. Alternatively, the $H_2$-SCR catalytic article may be positioned further downstream from the engine's exhaust outlet or exhaust manifold.

As used herein, the term "substrate" refers to the monolithic material onto which a catalyst material (such as the $H_2$-SCR catalyst composition or other catalyst compositions described herein) is placed, typically in the form of a washcoat. A washcoat is formed by preparing a slurry containing a specified solids content (e.g., 30-90% by weight) of catalyst in a liquid, which is then coated onto a substrate and dried to provide a washcoat layer. As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. The washcoat can optionally comprise a binder selected from silica, alumina, titania, zirconia, ceria, or a combination thereof. The loading of the binder is typically about 0.1 to 10 wt. % based on the weight of the washcoat.

Figure 14A:
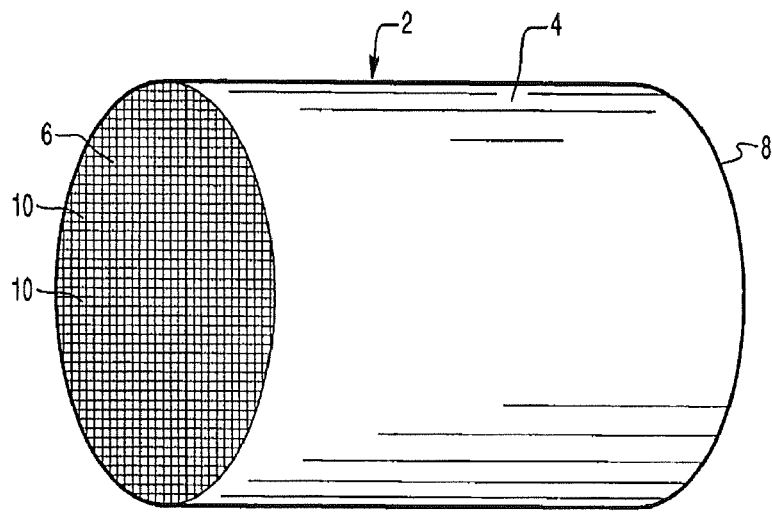
FIG. 14A is a perspective view of a honeycomb-type substrate which may comprise a catalyst composition of the invention.
Figure 14B:
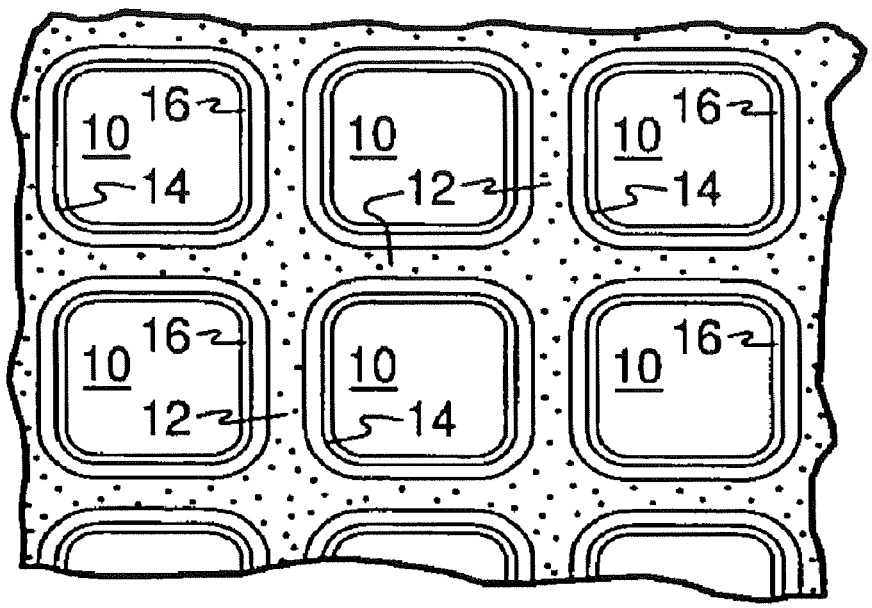
FIG. 14B is a partial cross-sectional view enlarged relative to FIG. 14A and taken along a plane parallel to the end faces of the carrier of FIG. 14A, which shows an enlarged view of a plurality of the gas flow passages shown in FIG. 14A.

In one or more embodiments, the substrate is selected from one or more of a flow-through honeycomb monolith or a particulate filter, and the catalytic material(s) are applied to the substrate as a washcoat. FIGS. 14A and 14B illustrate an exemplary substrate 2 in the form of a flow-through substrate coated with a catalyst composition as described herein. Referring to FIG. 14A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 14B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 14B, walls 12 are so dimensioned and configured that gas flow passages 10 have a substantially regular polygonal shape. As shown, the catalyst composition can be applied in multiple, distinct layers if desired. In the illustrated embodiment, the catalyst composition consists of both a discrete bottom layer 14 adhered to the walls 12 of the carrier member and a second discrete top layer 16 coated over the bottom layer 14. The present invention can be practiced with one or more (e.g., 2, 3, or 4) catalyst layers and is not limited to the two-layer embodiment illustrated in FIG. 14B.

In one or more embodiments, the substrate is a ceramic or metal having a honeycomb structure. Any suitable substrate may be employed, such as a monolithic substrate of the type having fine, parallel gas flow passages extending there through from an inlet or an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section.

A ceramic substrate may be made of any suitable refractory material, e.g., cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like. Substrates useful for the catalyst of embodiments of the present invention may also be metallic in nature and be composed of one or more metals or metal alloys. A metallic substrate may include any metallic substrate, such as those with openings or "punch-outs" in the channel walls. Metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel, in each case based on the weight of the substrate.

In one or more embodiments, the substrate is a particulate filter. As used herein, the terms "particulate filter" or "soot filter" refer to a filter designed to remove particulate matter from an exhaust gas stream such as soot. Particulate filters include, but are not limited to honeycomb wall flow filters, partial filtration filters, wire mesh filters, wound fiber filters, sintered metal filters, and foam filters.

In certain embodiments, wall flow substrates used herein have a plurality of fine, substantially parallel gas flow passages extending along the longitudinal axis of the substrate. Typically, each passage is blocked at one end of the substrate body, with alternate passages blocked at opposite end-faces. Such monolithic substrates may contain up to about 900 or more flow passages (or "cells") per square inch of cross section, although far fewer may be used. For example, the substrate may have from about 7 to 600, more usually from about 100 to 400, cells per square inch ("cpsi"). The porous wall flow filter used in embodiments of the invention can be catalyzed in that the wall of said element has thereon or contained therein a platinum group metal. Catalytic materials may be present on the inlet side of the substrate wall alone, the outlet side alone, both the inlet and outlet sides, or the wall itself may consist all, or in part, of the catalytic material. In another embodiment, this invention may include the use of one or more catalyst layers and combinations of one or more catalyst layers on the inlet and/or outlet walls of the substrate.

Figure 15:
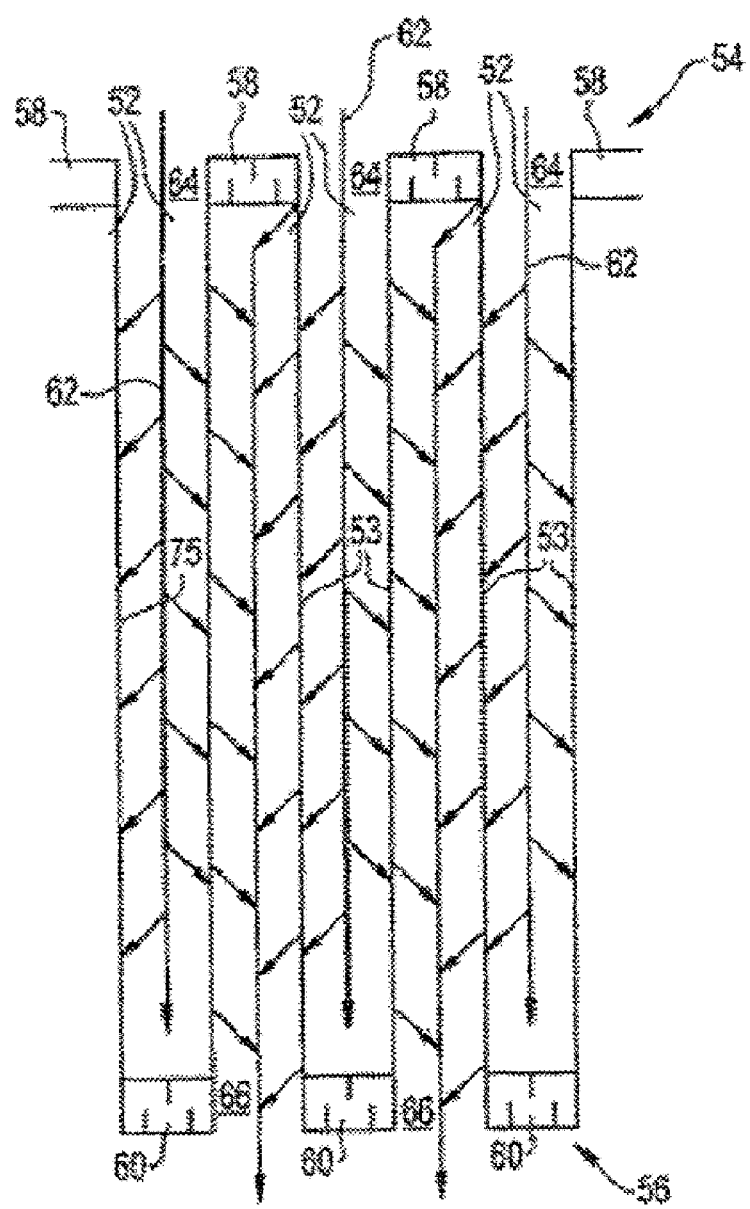
FIG. 15 shows a cross-sectional view of a section of a wall flow filter substrate which may comprise a catalyst composition of the invention.

As seen in FIG. 15, an exemplary wall flow substrate has a plurality of passages 52. The passages are enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in the invention can be catalyzed in that the wall of the substrate has thereon one or more catalytic materials.

$H_2$-SCR Catalyst Compositions

Suitable $H_2$-SCR catalyst compositions may be formed on a ceramic or metallic substrate upon which one or more catalyst coating compositions may be deposited. The substrate may comprise a flow through monolith or a porous wall flow filter as discussed in further detail herein. The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like. The metallic substrates may be composed of one or more metals or metal alloys. The metallic substrates may be employed in various shapes such as corrugated sheet or monolithic form. Metals used for metallic substrates include the heat resistant metals and metal alloys such as titanium and stainless steel as well as other alloys in which iron is a substantial or major component. Such alloys may contain one or more of nickel, chromium and/or aluminum. The alloys may also contain small or trace amounts of one or more other metals such as manganese, copper, vanadium, titanium and the like.

The catalyst coating composition deposited on the substrate of a $H_2$-SCR article may include one or more PGM components or another catalytic metal such as Au or Ag. The PGM may be selected from the group consisting of Pd, Pt, Rh, Ir, Ru, Os, and combinations thereof. In some embodiments, the coating may comprise platinum, palladium, or a combination thereof. For instance, the platinum to palladium weight ratio may range from about 1:10 to about 10:1, from about 1:5 to about 10:1, from about 1:1 to about 10:1, from about 2:1 to about 10:1, or from about 3:1 to about 5:1. An exemplary PGM loading for the $H_2$-SCR catalytic article is about 1 to about 200 g/ft$^3$, such as about 10 to about 50 g/ft$^3$.

The catalyst coating composition may further comprise a support for the PGM component or components. Each PGM component can be supported on the same or a different support. Each supported PGM catalyst can be prepared separately or multiple PGM components can be impregnated in the same process on the same support.

The support may be zeolitic or non-zeolitic. Examples of non-zeolitic supports include, but are not limited to, high surface area refractory metal oxides. High surface area refractory metal oxide supports can comprise an activated compound selected from the group consisting of alumina, zirconia, silica, titania, magnesia, ceria, lanthana, baria, tungsten oxide, and combinations thereof. Exemplary combinations include titania-zirconia, zirconia-tungsten oxide, titania-tungsten oxide, silica-alumina, and magnesia-ceria. Examples of zeolitic supports include, but are not limited to, small pore molecular sieves having the framework type of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SFW, SIV, THO, TSC, UEI, UFI, VNI, YUG, and ZON, medium pore molecular sieve having the Framework Type of MFI, FER, MWW, or EUO, large pore molecular sieve having the Framework Type of CON, BEA, FAU, MOR, or EMT, as well as mixtures thereof. The hydrogen form of the zeolite is advantageous in certain embodiments, which can be prepared by ion exchange with hydrogen according to techniques known in the art. Examples of hydrogen form zeolites include H—Y, H-Beta, H-ZSM-5, H-Chabazite, H-Ferrierite, H-Mordenite, and the like.

The coating may be present at a concentration from about 10 g/ft$^3$, about 20 g/ft$^3$, about 30 g/ft$^3$, about 40 g/ft$^3$, about 50 g/ft$^3$ or about 60 g/ft$^3$ to about 100 g/ft$^3$, about 150 g/ft$^3$, about 200 g/ft$^3$ or about 250 g/ft$^3$, based on the substrate. In some embodiments, the coating may be uniform. Alternatively, the substrate may be zone coated and/or layer coated.

LTNA Catalyst Compositions

Suitable LTNA compositions may be selected to allow for low temperature NOx adsorption and storage while releasing the adsorbed NOx compounds during continuous lean operations, without the need for an active regeneration (rich phase) step. The LTNA composition would preferably be able to withstand temperatures as high as about 800° C., be robust to sulfur poisoning, be able to release sulfur and recover NOx storage capacity under lean conditions, and be cost effective by optimizing the PGM loading and PGM type, In some embodiments, the LTNA may be coated on a substrate such as a flow through monolith or a porous wall flow filter, which may be either ceramic or metallic. Ceramic substrates may be selected from the group consisting of alumina, silica, titania, ceria, zirconia, magnesia, zeolites, silicon nitride, silicon carbide, zirconium silicates, magnesium, silicates, aluminosilicates, metallo aluminosilicates (such as cordierite and spudomene), or a mixture or mixed oxide of any two or more thereof. Metallic substrates may be made of any suitable metal, and in particular heat-resistant metals and metal alloys such as titanium and stainless steel as well as ferritic alloys containing iron, nickel, chromium, and/or aluminum in addition to other trace metals.

The LTNA composition may further comprise a support comprising extensive three dimensional networks such as molecular sieves. The molecular sieves may be small pore molecular sieves having the framework type of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SFW, SIV, THO, TSC, UEI, UFI, VNI, YUG, and ZON, medium pore molecular sieve having the Framework Type of MFI, FER, MWW, or EUO, large pore molecular sieve having the Framework Type of CON, BEA, FAU, MOR, or EMT, as well as mixtures thereof.

The LTNA may further comprise PGM selected from the group consisting of Pd, Pt, Rh, Au, Ag, Ir, Ru, Os, and combinations thereof. The loading of the PGM may be in the range of about 10 g/ft$^3$ to about 250 g/ft$^3$, for example from about 20 g/ft$^3$, about 30 g/ft$^3$, about 40 g/ft$^3$, about 50 g/ft$^3$ or about 60 g/ft$^3$ to about 100 g/ft$^3$, about 150 g/ft$^3$ or about 200 g/ft$^3$, based on the substrate.

LNT Catalyst Compositions

Suitable LNT catalyst compositions comprise a NOx sorbent and a support, for instance a NOx sorbent and a platinum group metal component dispersed on a refractory metal oxide support. The LNT catalyst composition may optionally contain other components such as oxygen storage components. The LNT catalyst composition may be in the form of a single layer or a multi-layer coating. For instance, a bi-layer catalyst coating with a bottom layer adhered to the substrate and the top layer overlying and in contact with a portion of or the entire bottom layer.

A suitable NOx sorbent comprises a basic oxygenated compound of an alkaline earth element selected from magnesium, calcium, strontium, barium and mixtures thereof and an oxygenated compound of a rare earth comprising cerium (ceria component). The rare earth may further contain one or more of lanthanum, neodymium or praseodymium.

The NOx sorbent component may be present for instance in a concentration of from about 0.1 to about 4.0 g/in$^3$, for example from about 0.2 g/in$^3$, about 0.3 g/in$^3$, about 0.4 g/in$^3$, about 0.5 g/in$^3$, about 0.6 g/in$^3$, about 0.7 g/in$^3$ or about 0.8 g/in$^3$ to about 1.0 g/in$^3$, about 1.5 g/in$^3$, about 2.0 g/in$^3$, about 2.5 g/in$^3$, about 3.0 g/in$^3$ or about 3.5 g/in$^3$, based on the substrate.

Platinum group metal components promote oxidation and reduction of nitrogen species. The loading of the platinum group metal component may be in the range of about 10 g/ft$^3$ to about 250 g/ft$^3$, for example from about 20 g/ft$^3$, about 30 g/ft$^3$, about 40 g/ft$^3$, about 50 g/ft$^3$ or about 60 g/ft$^3$ to about 100 g/ft$^3$, about 150 g/ft$^3$ or about 200 g/ft$^3$, based on the substrate. If more than one coating layers are present, a platinum group metal component in different layers may be identical or different. Likewise, the amounts of platinum group metal components in different layers may be identical or different.

The support comprises at least a high surface area refractory metal oxide such as alumina, titania, zirconia; mixtures of alumina with one or more of titania, zirconia, silica, chromia, and ceria; ceria coated on alumina or titania coated on alumina. The refractory metal oxide may have a specific surface area of about 50 m$^2$/g to about 300 m$^2$/g and may be present for instance in a concentration of from about 1.5 g/in$^3$ to about 7.0 g/in$^3$, based on the substrate.

DOC Catalyst Compositions

Suitable DOC catalysts may be formed on a ceramic or metallic substrate upon which one or more catalyst coating compositions may be deposited. Suitable DOC substrates may include a ceramic or metal honeycomb structure.

The DOC substrate may be a monolith having fine, parallel gas flow passages extending therethrough from an inlet or an outlet of the substrate, such that passages are open to fluid flow therethrough (referred to herein as flow-through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such monolithic carriers may contain up to about 1200 or more flow passages (or "cells") per square inch of cross section, although far fewer may be used. Flow-through substrates typically have a wall thickness between 0.002 and 0.1 inches.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

The metallic substrates may be composed of one or more metals or metal alloys. The metallic substrates may be employed in various shapes such as corrugated sheet or monolithic form. Metals used for metallic substrates include the heat resistant metals and metal alloys such as titanium and stainless steel as well as other alloys in which iron is a substantial or major component. Such alloys may contain one or more of nickel, chromium and/or aluminum. The alloys may also contain small or trace amounts of one or more other metals such as manganese, copper, vanadium, titanium and the like.

The catalyst coating composition deposited on the substrate of a DOC article may include one or more layers of platinum group metals that promote oxidation of noxious compounds. In some embodiments, the coating may comprise platinum, palladium, or a combination thereof. For instance, the platinum to palladium weight ratio may range from about 1:10 to about 10:1, from about 1:5 to about 10:1, from about 1:1 to about 10:1, from about 2:1 to about 10:1, or from about 3:1 to about 5:1. The coating may be present at a concentration from about 10 g/ft$^3$, about 20 g/ft$^3$, about 30 g/ft$^3$, about 40 g/ft$^3$, about 50 g/ft$^3$ or about 60 g/ft$^3$ to about 100 g/ft$^3$, about 150 g/ft$^3$, about 200 g/ft$^3$ or about 250 g/ft$^3$, based on the substrate. In some embodiments, the coating may be uniform. Alternatively, the substrate may be zone coated.

SCR Catalyst Compositions

SCR compositions may be employed in catalytic articles used exclusively for SCR as well as for zoned catalytic articles used, for instance, for H$_2$-SCR, SCR with AMOX, etc. Suitable SCR compositions may be in the form of a catalytic coating comprising one or more coating layers and may be disposed at least on a portion of a substrate. SCR catalysts include base metal (e.g., copper and/or iron) ion-exchanged molecular sieves.

Present molecular sieves for instance have 8-ring pore openings and double-six ring secondary building units, for example, those having the following structure types: AEI, AFT, AFX, CHA, EAB, ERI, KFI, LEV, SAS, SAT or SAV. In one or more embodiments, the 8-ring small pore molecular sieve has the CHA crystal structure.

The molecular sieves may have a silica to alumina ratio (SAR) of from about 2, about 5, about 8, about 10, about 15, about 20 or about 25 to about 30, about 35, about 40, about 45, about 50, about 60, about 70, about 80 about 90, about 100, about 150, about 200, about 260, about 300, about 400, about 500, about 750 or about 1000.

In some embodiments, the molecular sieves may have a SAR of from about 2 to about 300, from about 5 to about 250, from about 10 to about 250, from about 15 to about 250, from about 10 to about 200, from about 10 to about 100, from about 10 to about 75, from about 10 to about 60, from about 10 to about 50, from about 15 to about 100, from about 15 to about 75, from about 15 to about 60, from about 15 to about 50, from about 20 to about 100, from about 20 to about 75, from about 20 to about 60 or from about 20 to about 50.

For example the amount of copper in the molecular sieve may be about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0 wt %, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, about 5.0 wt %, or about 10.0 wt %, based on the total weight of a copper-containing molecular sieve.

For example, the amount of iron in the iron-containing molecular sieve is about 1.0, about 3.0, about 3.5, about 4.0, about 4.5, about 5.0, about 5.5, about 6.0, about 6.5, about 7.0, about 7.5, about 8.0, about 8.5, about 9.0, about 9.5, about 10 wt %, or about 15 wt %, based on the total weight of the molecular sieve.

Amounts of catalytic metals like copper or iron in a molecular sieve are reported as the oxide, CuO or Fe$_2$O$_3$.

The copper- or iron-containing molecular sieves may exhibit a BET surface area, determined according to DIN 66131, of at least about 400 m$^2$/g, at least about 550 m$^2$/g or at least about 650 m$^2$/g, for example from about 400 to about 750 m$^2$/g or from about 500 to about 750 m$^2$/g. The molecular sieves may have a mean crystal size of from about 10 nanometers to about 10 microns, from about 50 nanometers to about 5 microns or from about 0.1 microns to about 0.5 microns as determined via SEM.

Molecular sieves refer to materials having an extensive three-dimensional network of oxygen ions containing generally tetrahedral type sites and having a pore distribution of relatively uniform pore size. A zeolite is a specific example of a molecular sieve, further including silicon and aluminum. Reference to a "non-zeolite-support" or "non-zeolitic support" in a catalyst layer refers to a material that is not a zeolite and that receives precious metals, stabilizers, promoters, binders and the like through association, dispersion, impregnation or other suitable methods. Examples of such non-zeolitic supports include, but are not limited to, high surface area refractory metal oxides. A non-limiting example of an SCR catalyst with a non-zeolitic support may be the vanadium titanium catalyst.

When present on a substrate, for example a honeycomb monolith substrate, SCR catalyst compositions are present at a concentration of for instance from about 0.3 to 4.5 g/in$^3$, or from about 0.4, about 0.5, about 0.6, about 0.7, about 0.8, about 0.9 or about 1.0 g/in$^3$ to about 1.5 g/in$^3$, about 2.0 g/in$^3$, about 2.5 g/in$^3$, about 3.0 g/in$^3$, about 3.5 g/in$^3$ or about 4.0 g/in$^3$, based on the substrate.

AMOX Catalyst Compositions

AMOX catalysts are taught, for instance, in U.S. Pub. No. 2011/0271664. An ammonia oxidation (AMOX) catalyst may be a supported precious metal component which is effective to remove ammonia from an exhaust gas stream. The precious metal may include ruthenium, rhodium, iridium, palladium, platinum, silver or gold. For example, the precious metal component includes physical mixtures or chemical or atomically-doped combinations of precious metals. The precious metal component, for instance, includes platinum. Platinum may be present in an amount of from about 0.008% to about 2 wt % based on the AMOX catalyst.

The precious metal component (such as a PGM component) is typically deposited on a high surface area refractory metal oxide support. Examples of suitable high surface area refractory metal oxides include alumina, silica, titania, ceria, and zirconia, as well as physical mixtures, chemical combinations and/or atomically-doped combinations thereof. In specific embodiments, the refractory metal oxide may contain a mixed oxide such as silica-alumina, amorphous or crystalline aluminosilicates, alumina-zirconia, alumina-lanthana, alumina-baria, alumina-ceria and the like. An exemplary refractory metal oxide comprises high surface area γ-alumina having a specific surface area of about 50 to about 300 m$^2$/g.

The AMOX catalyst may include a zeolitic or non-zeolitic molecular sieve, for example, selected from those of the CHA, FAU, BEA, MFI and MOR types. A molecular sieve may be physically mixed with an oxide-supported platinum component. In an alternative embodiment, platinum may be distributed on the external surface or in the channels, cavities or cages of the molecular sieve.

CSF Compositions

The catalyzed soot filter may comprise a "flow-through" substrate as the ones described herein and may have a catalytic coating disposed thereon. Alternatively, the soot filter may comprise a wall-flow filter substrate made from materials such as cordierite, aluminum titanate, or silicon carbide. Loading of the catalytic coating on a wall-flow substrate will depend on substrate properties such as porosity and wall thickness and typically will be lower than the catalyst loading on a flow-through substrate. The type of catalytic coating on the CSF can vary, and can include an oxidation catalyst composition and/or an SCR catalyst composition.

Wall-flow filter substrates, as discussed herein, may have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross-section, although far fewer may be used. The cells can have cross-sections that are rectangular, square, circular, oval, triangular, hexagonal, or are of other polygonal shapes. Wall-flow substrates typically have a wall thickness from about 50 microns to about 2000 microns. Wall-flow filters will generally have a wall porosity of at least 50% with an average pore size of at least 5 microns prior to disposition of the catalytic coating.

In the present systems, the $H_2$-SCR substrate and/or DOC substrate and/or LNT substrate and/or $H_2$-SCR/DOC combined catalytic article substrate and/or SCR substrate and/or AMOX substrate and/or SCR/AMOX combined catalytic article substrate may each independently be selected from the group consisting of a flow-through monolith and a porous wall-flow substrate.

Methods for Treating Streams Containing NOx

In some embodiments, the present disclosure is directed to a method for treating an exhaust stream containing NOx, comprising passing the exhaust stream through the emission treatment systems or through catalytic articles disclosed herein.

Present methods include treating exhaust gas stream during a cold phase, or cold start phase, that is where the exhaust gas temperatures are about 200° C. or lower, about 175° C. or lower, about 150° C. or lower, about 125° C. or lower, or about 100° C. or lower.

Present articles, systems and methods are suitable for treatment of exhaust gas streams from mobile emissions sources. Articles, systems and methods are also suitable for treatment of exhaust streams from stationary sources such as power plants.

EXPERIMENTAL

Various catalyst compositions comprising one or more PGM metals supported on a metal oxide or zeolite support were prepared and tested for $H_2$-SCR reaction activity.

Sample Preparation

Method 1 (Single Metal Catalysts):

For Pt catalysts, a Pt amine hydroxide solution was impregnated onto a commercially available catalyst support using the incipient wetness technique to achieve a desirable metal loading. For Pd, Ru, Rh and Ir catalysts, the corresponding nitrate solutions were used for the impregnation. The impregnated support was then calcined at 500° C. for 2 hours in air. To shape the sample for reactor test, the calcined powder was dispersed in deionized water at about 30% solid content, and in this slurry an alumina binder (5% of the catalyst) was added. This slurry was continuously stirred until dry. The dried powder was further calcined at 450° C. for 2 hours in air and then crushed and sieved to 250-500 μm fraction. Before reactor testing, the sieved fraction was aged at 750° C. for 20 hours with 10% steam in air.

Method 2 (Pt/Pd Catalysts):

For Pt/Pd bimetallic catalysts, Pd nitrate solution was first impregnated on a support powder to achieve 100% incipient wetness. This Pd impregnated powder was dried at 100° C. before Pt impregnation. Pt was then impregnated on this Pd/support powder using the method similar to Method 1 and dried at 100° C. The Pt/Pd powder was then calcined at 450° C. for 2 hours in air. The sample shaping method and aging conditions are the same as described in Method 1.

Method 3 (PGM on $TiO_2$—$ZrO_2$):

The method is the same as Method 1. However, the support material was made in the lab following a procedure described by Machida et al. [M. Machida, S. Ikeda, D. Kurogi and T. Kijima, Appl. Catal. B 35 (2001) 107-116.] $TiO_2$—$ZrO_2$ (1:1) was prepared by co-precipitating Ti(OPr)$_4$ and ZrO(NO$_3$)$_2$ mixtures with NH$_4$OH solution. The precipitated solution was then evaporated to dryness. The resulting solid product was calcined at 450° C. in air. The sample shaping method and aging conditions are the same as described in Method 1.

Method 4 (PGM on MgO—$CeO_2$):

The method is the same as Method 1. However, the support material was made in the lab following a procedure described by Costa et al. [C. N Costa, P. G. Savva, J. L. Fierro, A. M. Efstathiou, Appl. Catal. B 75 (2007) 147-156. [2] EP 2269729 A1.] The MgO—$CeO_2$ support (1:1) was prepared by the sol-gel method using Mg(EtO)$_2$ and Ce(NO$_3$)$_3$ as precursors. The resulting solid was calcined at 600° C. for 4 hours in air. The Pt and Pd impregnation was conducted using the same method described in Method 1. The sample shaping method and aging conditions are the same as described in Method 1.

Method 5 (PGM on Sulfated MgO—$CeO_2$):

Same as Method 4, except a sulfation treatment was conducted before PGM impregnation. The MgO—$CeO_2$ support was treated with 20 ppm $SO_2$/air at 300° C. for 20 hours. The sample shaping method and aging conditions are the same as described in Method 1.

Method 6 (PGM on $WO_3$/$ZrO_2$):

The support material, $WO_3$/$ZrO_2$ (10% $WO_3$), was made in lab by impregnating (NH$_4$)$_6$H$_2$W$_{12}$O$_{41}$ solution onto a commercially available $ZrO_2$ support using the incipient wetness technique. The resulting powder was dried overnight at 110° C. for 2 hours in air and calcined at 500° C. for 2 hours before impregnating Pt or Pd. The sample shaping method and aging conditions are the same as described in Method 1.

Method 7 (Pd/(Al$_2$O$_3$+ZSM-5)+$TiO_2$):

Pd/(Al$_2$O$_3$+ZSM-5)+$TiO_2$ catalyst was prepared by impregnating Pd nitrate on a mixture of Al$_2$O$_3$ and ZSM-5 zeolite (3:1 by weight) using the procedure described in Method 1. To this Pd/(Al$_2$O$_3$+ZSM-5) material, $TiO_2$ was added (20% $TiO_2$ by weight). The mixture was calcined at 500° C. for 2 hours in air. The sample shaping method and aging conditions are the same as described in Method 1.

Reactor Test Conditions

The $H_2$-SCR reaction was tested with a high-throughput reactor capable of testing 48 samples in a single test run. The activity was measured at constant temperatures at 100, 125, 150, 175 and 200, 250 and 350° C. For each run, 0.2 g of sample was used with a flow rate of 50 L/min, which is equivalent a monolithic GHSV of 30,000 h$^{-1}$ with 2 g/in$^3$ washcoat loading. Several reaction feeds were used for activity measurement. The percentages noted below in the feed descriptions are by volume.

Feed 1: 200 ppm NO, 5% $O_2$, 5% $H_2O$, variable $H_2$ and balance $N_2$. $H_2$ concentration: 0.2, 0.4, 0.6, 0.8 and 1%.

Feed 2: 500 ppm CO, 200 ppm NO, 5% $O_2$, 5% $H_2O$, 1% $H_2$ and balance $N_2$.

Feed 3: 100 ppm $C_3H_6$, 200 ppm NO, 5% $O_2$, 5% $H_2O$, 1% $H_2$ and balance $N_2$.

Examples 1-1 to 1-37

A series of single metal catalysts were prepared using the sample preparation methods noted above. These catalysts were designated 1-1 through 1-37 and are set forth in Table 1 below, with the metal loading, support, presence of an additive, and the sample preparation method noted therein.

TABLE 1

List of single metal catalysts*

| Sample ID | Sample Name | Metal | Support | Additive | Preparation method |
|---|---|---|---|---|---|
| 1-1 | 1% Pt/Al$_2$O$_3$ | 1% Pt | Al$_2$O$_3$ | | 1 |
| 1-2 | 1% Pt/SiO$_2$ | 1% Pt | SiO$_2$ | | 1 |
| 1-3 | 1% Pt/CeO$_2$ | 1% Pt | CeO$_2$ | | 1 |
| 1-4 | 1% Pt/TiO$_2$ | 1% Pt | TiO$_2$ | | 1 |
| 1-5 | 1% Pt/ZrO$_2$ | 1% Pt | ZrO$_2$ | | 1 |
| 1-6 | 1% Pt/TiO$_2$—ZrO$_2$ | 1% Pt | TiO$_2$—ZrO$_2$ | | 3 |
| 1-7 | 1% Pt/WO$_3$/ZrO$_2$ | 1% Pt | WO$_3$/ZrO$_2$ | | 6 |
| 1-8 | 1% Pt/WO$_3$/TiO$_2$ | 1% Pt | WO$_3$/TiO$_2$ | | 1 |
| 1-9 | 1% Pt/SiO$_2$/Al$_2$O$_3$ | 1% Pt | SiO$_2$/Al$_2$O$_3$ | | 1 |
| 1-10 | 1% Pt/MgO | 1% Pt | MgO | | 1 |
| 1-11 | 1% Pt/MgO—CeO$_2$ | 1% Pt | MgO—CeO$_2$ | | 4 |
| 1-12 | 0.1% Pt/MgO—CeO$_2$ (A) | 0.1% Pt | MgO—CeO$_2$ | | 4 |
| 1-13 | 0.1% Pt/MgO—CeO$_2$ (B) | 0.1% Pt | MgO—CeO$_2$ | | 5 |
| 1-14 | 1% Pt/H—Y | 1% Pt | H—Y | | 1 |
| 1-15 | 1% Pt/H-ZSM-5 | 1% Pt | H-ZSM-5 | | 1 |
| 1-16 | 1% Pt/H-Beta | 1% Pt | H-Beta | | 1 |
| 1-17 | 1% Pt/H-Chabazite | 1% Pt | H-Chabazite | | 1 |
| 1-18 | 1% PdAl$_2$O$_3$ | 1% Pd | Al$_2$O$_3$ | | 1 |
| 1-19 | 1% Pd/SiO$_2$ | 1% Pd | SiO$_2$ | | 1 |
| 1-20 | 1% Pd/CeO$_2$ | 1% Pd | CeO$_2$ | | 1 |
| 1-21 | 1% Pd/TiO$_2$ | 1% Pd | TiO$_2$ | | 1 |
| 1-22 | 1% Pd/ZrO$_2$ | 1% Pd | ZrO$_2$ | | 1 |
| 1-23 | 1% Pd/TiO$_2$—ZrO$_2$ | 1% Pd | TiO$_2$—ZrO$_2$ | | 3 |
| 1-24 | 1% Pd/WO$_3$/ZrO$_2$ | 1% Pd | WO$_3$/ZrO$_2$ | | 6 |
| 1-25 | 1% Pd/WO$_3$/TiO$_2$ | 1% Pd | WO$_3$/TiO$_2$ | | 1 |
| 1-26 | 1% Pd/SiO$_2$/Al$_2$O$_3$ | 1% Pd | SiO$_2$/Al$_2$O$_3$ | | 1 |
| 1-27 | 1% Pd/MgO | 1% Pd | MgO | | 1 |
| 1-28 | 1% Pd/MgO—CeO$_2$ | 1% Pd | MgO—CeO$_2$ | | 4 |
| 1-29 | 1% Pd/H—Y | 1% Pd | H—Y | | 1 |
| 1-30 | 1% Pd/H-ZSM-5 | 1% Pd | H-ZSM-5 | | 1 |
| 1-31 | 1% Pd/H-Beta | 1% Pd | H-Beta | | 1 |
| 1-32 | 1% PdH-Chabazite | 1% Pd | H-Chabazite | | 1 |
| 1-33 | 1% Pd/(Al$_2$O$_3$ + ZSM-5) + TiO$_2$ | 1% Pd | Al$_2$O$_3$ + ZSM-5 | TiO$_2$ | 7 |
| 1-34 | 0.2% Pd/(Al$_2$O$_3$ + ZSM-5) + TiO$_2$ | 0.2% Pd | Al$_2$O$_3$ + ZSM-5 | TiO$_2$ | 7 |
| 1-35 | 1% Rh/Al$_2$O$_3$ | 1% Rh | Al$_2$O$_3$ | | 1 |
| 1-36 | 1% Ru/Al$_2$O$_3$ | 1% Ru | Al$_2$O$_3$ | | 1 |
| 1-37 | 1% Ir/Al$_2$O$_3$ | 1% Ir | Al$_2$O$_3$ | | 1 |

*Metal % is based on weight.

Examples 2-1 to 2-47

A further series of single metal and bimetallic catalysts were prepared using the sample preparation methods noted above. These catalysts were designated 2-1 through 2-47 and are set forth in Table 2 below, with the metal loading and support shown. All of the single metal catalysts in Table 2 were made using Method 1 above and all the bimetallic catalysts in Table 2 were made using Method 2 above.

TABLE 2

List of Pt—Pd bimetallic catalysts*

| Sample ID | Sample Name | Metal | Support |
|---|---|---|---|
| 2-1 | Pt/Mg—Y | Pt-only | Mg—Y (Mg exchanged) |
| 2-2 | Pt/H—Y | Pt-only | H—Y |
| 2-3 | Pt/Beta | Pt-only | H-Beta |
| 2-4 | Pt/H-CHA | Pt-only | H-Chabazite |
| 2-5 | Pt/H-ZSM-5 | Pt-only | H-ZSM-5 |
| 2-6 | Pt/H-MOR | Pt-only | H-Mordenite |
| 2-7 | Pt/H-FER | Pt-only | H-Ferrierite |
| 2-8 | Pt/ZrO$_2$ | Pt-only | ZrO$_2$ |
| 2-9 | Pt/WO$_3$/TiO$_2$ | Pt-only | WO$_3$/TiO$_2$ |
| 2-10 | Pt/MgO | Pt-only | MgO |
| 2-11 | Pt/Mg—Al HT | Pt-only | Calcined Mg/Al hydrotalcite |
| 2-12 | Pt/Pd_8:1/H—Y | Pt/Pd = 8:1 | H—Y |
| 2-13 | Pt/Pd_8:1/H-Beta | Pt/Pd = 8:1 | H-Beta |
| 2-14 | Pt/Pd_8:1/H-CHA | Pt/Pd = 8:1 | H-Chabazite |
| 2-15 | Pt/Pd_8:1/H-ZSM-5 | Pt/Pd = 8:1 | H-ZSM-5 |
| 2-16 | Pt/Pd_8:1/H-MOR | Pt/Pd = 8:1 | H-Mordenite |
| 2-17 | Pt/Pd_8:1/H-FER | Pt/Pd = 8:1 | H-Ferrierite |
| 2-18 | Pt/Pd_8:1/ZrO$_2$ | Pt/Pd = 8:1 | ZrO$_2$ |
| 2-19 | Pt/Pd_8:1/WO$_3$/TiO$_2$ | Pt/Pd = 8:1 | WO$_3$/TiO$_2$ |
| 2-20 | Pt/Pd_4:1/H—Y | Pt/Pd = 4:1 | H—Y |
| 2-21 | Pt/Pd_4:1/H-Beta | Pt/Pd = 4:1 | H-Beta |
| 2-22 | Pt/Pd_4:1/H-CHA | Pt/Pd = 4:1 | H-Chabazite |
| 2-23 | Pt/Pd_4:1/H-ZSM-5 | Pt/Pd = 4:1 | H-ZSM-5 |
| 2-24 | Pt/Pd_4:1/H-MOR | Pt/Pd = 4:1 | H-Mordenite |
| 2-25 | Pt/Pd_4:1/H-FER | Pt/Pd = 4:1 | H-Ferrierite |
| 2-26 | Pt/Pd_4:1/ZrO$_2$ | Pt/Pd = 4:1 | ZrO$_2$ |
| 2-27 | Pt/Pd_4:1/WO$_3$/TiO$_2$ | Pt/Pd = 4:1 | WO$_3$/TiO$_2$ |
| 2-28 | Pt/Pd_4:1/MgO | Pt/Pd = 4:1 | MgO |
| 2-29 | Pt/Pd_4:1/Mg—Al | Pt/Pd = 4:1 | Calcined Mg/Al hydrotalcite |
| 2-30 | Pt/Pd_2:1/H—Y | Pt/Pd = 2:1 | H—Y |
| 2-31 | Pt/Pd_2:1/H-Beta | Pt/Pd = 2:1 | H-Beta |
| 2-32 | Pt/Pd_2:1/H-CHA | Pt/Pd = 2:1 | H-Chabazite |
| 2-33 | Pt/Pd_2:1/H-ZSM-5 | Pt/Pd = 2:1 | H-ZSM-5 |
| 2-34 | Pt/Pd_2:1/H-MOR | Pt/Pd = 2:1 | H-Mordenite |
| 2-35 | Pt/Pd_2:1/H-FER | Pt/Pd = 2:1 | H-Ferrierite |
| 2-36 | Pt/Pd_2:1/ZrO$_2$ | Pt/Pd = 2:1 | ZrO$_2$ |
| 2-37 | Pt/Pd_2:1/WO$_3$/TiO$_2$ | Pt/Pd = 2:1 | WO$_3$/TiO$_2$ |
| 2-38 | Pd/H—Y | Pd-only | H—Y |
| 2-39 | Pd/Beta | Pd-only | H-Beta |
| 2-40 | Pd/H-CHA | Pd-only | H-Chabazite |
| 2-41 | Pd/H-ZSM-5 | Pd-only | H-ZSM-5 |
| 2-42 | Pt/H-MOR | Pd-only | H-Mordenite |
| 2-43 | Pd/H-FER | Pd-only | H-Ferrierite |
| 2-44 | Pd/ZrO$_2$ | Pd-only | ZrO$_2$ |

TABLE 2-continued

List of Pt—Pd bimetallic catalysts*

| Sample ID | Sample Name | Metal | Support |
|---|---|---|---|
| 2-45 | Pd/WO$_3$/TiO$_2$ | Pd-only | WO$_3$/TiO$_2$ |
| 2-46 | Pd/MgO | Pd-only | MgO |
| 2-47 | Pd/Mg—Al | Pd-only | Calcined Mg/Al hydrotalcite |

*Total metal loading is 1% by weight; Pt/Pd is weight ratio.

Table 3 below summarizes the NO$_x$ conversion and N$_2$ yield (NO$_x$ converted to N$_2$) of single metal catalysts 1-1 through 1-37 tested at 125° C. with 0.4% H$_2$ in the feed gas. In general, Pt catalysts are more active (higher NO$_x$ conversion) than the corresponding Pd catalysts. However, Pt catalysts normally also produce more N$_2$O (a byproduct). The top 10 catalysts for highest N$_2$ yield are Pt/HY>Pd/HCHA~Pt/HZSM-5~Pt/ZrO$_2$>Pt/HCHA>Pt/TiO$_2$—ZrO$_2$>Pd/MgO>Pt/TiO$_2$~Pd/TiO$_2$>Pd/HBeta.

TABLE 3

Performance of catalysts tested at 125° C. with 0.4% H$_2$ in feed

| Sample ID | Sample Name | NO$_x$ Conversion (%) | N$_2$ Yield (%) |
|---|---|---|---|
| 1-1 | 1% Pt/Al$_2$O$_3$ | 85 | 23 |
| 1-2 | 1% Pt/SiO$_2$ | 100 | 23 |
| 1-3 | 1% Pt/CeO$_2$ | 5 | 1 |
| 1-4 | 1% Pt/TiO$_2$ | 93 | 30 |
| 1-5 | 1% Pt/ZrO$_2$ | 93 | 57 |
| 1-6 | 1% Pt/TiO$_2$—ZrO$_2$ | 87 | 47 |
| 1-7 | 1% Pt/WO$_3$/ZrO$_2$ | 65 | 34 |
| 1-8 | 1% Pt/WO$_3$/TiO$_2$ | 68 | 19 |
| 1-9 | 1% Pt/SiO$_2$/Al$_2$O$_3$ | 85 | 23 |
| 1-10 | 1% Pt/MgO | 39 | 32 |
| 1-11 | 1% Pt/MgO—CeO$_2$ | 9 | 4 |
| 1-12 | 0.1% Pt/MgO—CeO$_2$ (A) | 7 | 3 |
| 1-13 | 0.1% Pt/MgO—CeO$_2$ (B) | 3 | 0 |
| 1-14 | 1% Pt/H—Y | 95 | 66 |
| 1-15 | 1% Pt/H-ZSM-5 | 96 | 57 |
| 1-16 | 1% Pt/H-Beta | 35 | 21 |
| 1-17 | 1% Pt/H-CHA | 92 | 54 |
| 1-18 | 1% PdAl$_2$O$_3$ | 2 | 0 |
| 1-19 | 1% Pd/SiO$_2$ | 10 | 2 |
| 1-20 | 1% Pd/CeO$_2$ | 6 | 2 |
| 1-21 | 1% Pd/TiO$_2$ | 37 | 30 |
| 1-22 | 1% Pd/ZrO$_2$ | 0 | 0 |
| 1-23 | 1% Pd/TiO$_2$—ZrO$_2$ | 29 | 18 |
| 1-24 | 1% Pd/WO$_3$/ZrO$_2$ | 24 | 21 |
| 1-25 | 1% Pd/WO$_3$/TiO$_2$ | 26 | 17 |
| 1-26 | 1% Pd/SiO$_2$/Al$_2$O$_3$ | 4 | 1 |
| 1-27 | 1% Pd/MgO | 66 | 43 |
| 1-28 | 1% Pd/MgO—CeO$_2$ | 33 | 18 |
| 1-29 | 1% Pd/H—Y | 44 | 25 |
| 1-30 | 1% Pd/H-ZSM-5 | 28 | 17 |
| 1-31 | 1% Pd/H-Beta | 42 | 26 |
| 1-32 | 1% PdH-CHA | 68 | 58 |
| 1-33 | 1% Pd/(Al$_2$O$_3$ + ZSM-5) + TiO$_2$ | 9 | 6 |
| 1-34 | 0.2% Pd/(Al$_2$O$_3$ + ZSM-5) + TiO$_2$ | 8 | 5 |
| 1-35 | 1% Rh/Al$_2$O$_3$ | 5 | 2 |
| 1-36 | 1% Ru/Al$_2$O$_3$ | 4 | 1 |
| 1-37 | 1% Ir/Al$_2$O$_3$ | 5 | 2 |

Table 4 below shows the NO$_x$ conversions of catalysts 1-1 through 1-37 tested at various temperatures with 1% H$_2$ in feed. The activity on most of the catalyst is significantly increased with the increased H$_2$ concentration. Even at 100° C., most of the catalysts show >90% NO$_x$ conversion. The lowest activity was found on Rh, Ru and Ir catalysts as well as on the Pt and Pd catalysts supported on materials containing CeO$_2$.

TABLE 4

NO$_x$ conversion (%) of catalysts as a function of reaction temperature at 1% H$_2$

| Sample ID | Sample Name | 100° C. | 125° C. | 150° C. | 175° C. | 200° C. |
|---|---|---|---|---|---|---|
| 1-1 | 1% Pt/Al$_2$O$_3$ | 91 | 83 | 72 | 65 | 63 |
| 1-2 | 1% Pt/SiO$_2$ | 99 | 96 | 90 | 86 | 84 |
| 1-3 | 1% Pt/CeO$_2$ | 2 | 10 | 15 | 20 | 34 |
| 1-4 | 1% Pt/TiO$_2$ | 99 | 96 | 89 | 82 | 78 |
| 1-5 | 1% Pt/ZrO$_2$ | 71 | 92 | 92 | 87 | 78 |
| 1-6 | 1% Pt/TiO$_2$—ZrO$_2$ | 95 | 96 | 79 | 68 | 58 |
| 1-7 | 1% Pt/WO$_3$/ZrO$_2$ | 83 | 82 | 75 | 65 | 57 |
| 1-8 | 1% Pt/WO$_3$/TiO$_2$ | 90 | 88 | 82 | 73 | 65 |
| 1-9 | 1% Pt/SiO$_2$/Al$_2$O$_3$ | 92 | 85 | 79 | 76 | 74 |
| 1-10 | 1% Pt/MgO | 38 | 55 | 69 | 83 | 91 |
| 1-11 | 1% Pt/MgO—CeO$_2$ | 4 | 16 | 22 | 28 | 45 |
| 1-12 | 0.1% Pt/MgO—CeO$_2$ (A) | 4 | 15 | 21 | 25 | 38 |
| 1-13 | 0.1% Pt/MgO—CeO$_2$ (B) | 0 | 9 | 13 | 18 | 25 |
| 1-14 | 1% Pt/H—Y | 95 | 96 | 96 | 92 | 86 |
| 1-15 | 1% Pt/H-ZSM-5 | 99 | 100 | 90 | 81 | 73 |
| 1-16 | 1% Pt/H-Beta | 20 | 69 | 100 | 99 | 99 |
| 1-17 | 1% Pt/H-CHA | 97 | 91 | 81 | 74 | 68 |
| 1-18 | 1% PdAl$_2$O$_3$ | 18 | 26 | 31 | 32 | 34 |
| 1-19 | 1% Pd/SiO$_2$ | 41 | 35 | 47 | 48 | 62 |
| 1-20 | 1% Pd/CeO$_2$ | 2 | 11 | 18 | 23 | 41 |
| 1-21 | 1% Pd/TiO$_2$ | 97 | 96 | 97 | 94 | 90 |
| 1-22 | 1% Pd/ZrO$_2$ | 35 | 46 | 46 | 37 | 27 |
| 1-23 | 1% Pd/TiO$_2$—ZrO$_2$ | 86 | 88 | 87 | 79 | 70 |
| 1-24 | 1% Pd/WO$_3$/ZrO$_2$ | 86 | 90 | 90 | 89 | 83 |
| 1-25 | 1% Pd/WO$_3$/TiO$_2$ | 90 | 92 | 95 | 95 | 91 |
| 1-26 | 1% Pd/SiO$_2$/Al$_2$O$_3$ | 28 | 46 | 50 | 45 | 48 |
| 1-27 | 1% Pd/MgO | 92 | 99 | 96 | 93 | 87 |
| 1-28 | 1% Pd/MgO—CeO$_2$ | 86 | 80 | 72 | 61 | 51 |
| 1-29 | 1% Pd/H—Y | 90 | 90 | 89 | 87 | 81 |
| 1-30 | 1% Pd/H-ZSM-5 | 84 | 79 | 79 | 77 | 72 |
| 1-31 | 1% Pd/H-Beta | 96 | 97 | 94 | 91 | 85 |
| 1-32 | 1% PdH-CHA | 65 | 91 | 86 | 82 | 80 |
| 1-33 | 1% Pd/(Al$_2$O$_3$ + ZSM-5) + TiO$_2$ | 58 | 72 | 78 | 78 | 78 |
| 1-34 | 0.2% Pd/(Al$_2$O$_3$ + ZSM-5) + TiO$_2$ | 66 | 71 | 84 | 87 | 87 |
| 1-35 | 1% Rh/Al$_2$O$_3$ | 2 | 13 | 17 | 23 | 38 |
| 1-36 | 1% Ru/Al$_2$O$_3$ | 2 | 11 | 15 | 18 | 29 |
| 1-37 | 1% Ir/Al$_2$O$_3$ | 1 | 11 | 14 | 17 | 26 |

Table 5 below shows the NO$_x$ conversion and N$_2$ yield for catalysts 2-1 through 2-47 at 125° C. with 0.4% H$_2$. In general, the Pt/Pd catalysts behave more like Pt catalysts in NO$_x$ conversion and weakly dependent on Pt/Pd ratio. However, the N$_2$ yield is optimized at different Pt/Pd ratio for different supports. For example, for H—Y supported catalysts, the highest N$_2$ yield (70%) was found at Pt/Pd=8:1, while WO$_3$/TiO$_2$ supported catalysts show the highest N$_2$ yield (73%) at Pt/Pd=4:1. Most of the Pt/Pd catalysts show much higher N$_2$ yield than the corresponding Pd catalysts.

TABLE 5

Performance of catalysts tested at 125° C. with 0.4% $H_2$ in feed

| Sample ID | Sample Name | $NO_x$ Conversion (%) | $N_2$ Yield (%) |
|---|---|---|---|
| 2-1 | Pt/Mg—Y | 98 | 61 |
| 2-2 | Pt/H—Y | 97 | 62 |
| 2-3 | Pt/Beta | 96 | 71 |
| 2-4 | Pt/H-CHA | 91 | 60 |
| 2-5 | Pt/H-ZSM-5 | 93 | 51 |
| 2-6 | Pt/H-MOR | 93 | 52 |
| 2-7 | Pt/H-FER | 88 | 62 |
| 2-8 | Pt/$ZrO_2$ | 96 | 49 |
| 2-9 | Pt/$WO_3$/$TiO_2$ | 95 | 38 |
| 2-10 | Pt/MgO | 3 | 2 |
| 2-11 | Pt/Mg—Al HT | 48 | 27 |
| 2-12 | Pt/Pd_8:1/H—Y | 98 | 70 |
| 2-13 | Pt/Pd_8:1/H-Beta | 25 | 16 |
| 2-14 | Pt/Pd_8:1/H-CHA | 93 | 52 |
| 2-15 | Pt/Pd_8:1/H-ZSM-5 | 97 | 53 |
| 2-16 | Pt/Pd_8:1/H-MOR | 94 | 54 |
| 2-17 | Pt/Pd_8:1/H-FER | 91 | 64 |
| 2-18 | Pt/Pd_8:1/$ZrO_2$ | 96 | 40 |
| 2-19 | Pt/Pd_8:1/$WO_3$/$TiO_2$ | 97 | 60 |
| 2-20 | Pt/Pd_4:1/H—Y | 98 | 69 |
| 2-21 | Pt/Pd_4:1/H-Beta | 12 | 7 |
| 2-22 | Pt/Pd_4:1/H-CHA | 95 | 56 |
| 2-23 | Pt/Pd_4:1/H-ZSM-5 | 97 | 58 |
| 2-24 | Pt/Pd_4:1/H-MOR | Not tested | Not tested |
| 2-25 | Pt/Pd_4:1/H-FER | 87 | 61 |
| 2-26 | Pt/Pd_4:1/$ZrO_2$ | 97 | 43 |
| 2-27 | Pt/Pd_4:1/$WO_3$/$TiO_2$ | 97 | 67 |
| 2-28 | Pt/Pd_4:1/MgO | 9 | 2 |
| 2-29 | Pt/Pd_4:1/Mg—Al | 56 | 40 |
| 2-30 | Pt/Pd_2:1/H—Y | 98 | 65 |
| 2-31 | Pt/Pd_2:1/H-Beta | 13 | 7 |
| 2-32 | Pt/Pd_2:1/H-CHA | 94 | 55 |
| 2-33 | Pt/Pd_2:1/H-ZSM-5 | 94 | 58 |
| 2-34 | Pt/Pd_2:1/H-MOR | 90 | 55 |
| 2-35 | Pt/Pd_2:1/H-FER | 95 | 65 |
| 2-36 | Pt/Pd_2:1/$ZrO_2$ | 97 | 53 |
| 2-37 | Pt/Pd_2:1/$WO_3$/$TiO_2$ | 93 | 73 |
| 2-38 | Pd/H—Y | 36 | 19 |
| 2-39 | Pd/Beta | 42 | 26 |
| 2-40 | Pd/H-CHA | 68 | 58 |
| 2-41 | Pd/H-ZSM-5 | 28 | 17 |
| 2-42 | Pd/H-MOR | 25 | 8 |
| 2-43 | Pd/H-FER | 20 | 6 |
| 2-44 | Pd/$ZrO_2$ | 42 | 28 |
| 2-45 | Pd/$WO_3$/$TiO_2$ | 44 | 36 |
| 2-46 | Pd/MgO | 1 | 1 |
| 2-47 | Pd/Mg—Al | 1 | 1 |

Table 6 below shows the $NO_x$ conversions for catalysts 2-1 through 2-47 tested at various temperatures with 1% $H_2$ in feed. The activity on most of the catalyst is significantly increased with the increased $H_2$ concentration. Even at 100° C., most of the catalysts show >90% $NO_x$ conversion. The lowest activity was found on MgO supported catalysts.

TABLE 6

$NO_x$ conversion (%) of catalysts as a function of reaction temperature at 1% $H_2$

| Sample ID | Sample Name | 100° C. | 125° C. | 150° C. | 175° C. | 200° C. |
|---|---|---|---|---|---|---|
| 2-1 | Pt/Mg—Y | 91 | 98 | 94 | 83 | 74 |
| 2-2 | Pt/H—Y | 97 | 98 | 98 | 91 | 81 |
| 2-3 | Pt/Beta | 69 | 98 | 98 | 98 | 94 |
| 2-4 | Pt/H-CHA | 96 | 96 | 88 | 80 | 71 |
| 2-5 | Pt/H-ZSM-5 | 97 | 96 | 86 | 77 | 68 |
| 2-6 | Pt/H-MOR | 96 | 96 | 86 | 78 | 70 |
| 2-7 | Pt/H-FER | 94 | 94 | 88 | 83 | 76 |
| 2-8 | Pt/$ZrO_2$ | 96 | 92 | 87 | 78 | 68 |
| 2-9 | Pt/$WO_3$/$TiO_2$ | 98 | 95 | 89 | 79 | 67 |
| 2-10 | Pt/MgO | 3 | 11 | 28 | 59 | 80 |
| 2-11 | Pt/Mg—Al HT | 14 | 62 | 98 | 97 | 97 |
| 2-12 | Pt/Pd_8:1/H—Y | 98 | 98 | 98 | 89 | 78 |
| 2-13 | Pt/Pd_8:1/H-Beta | 14 | 59 | 98 | 98 | 97 |
| 2-14 | Pt/Pd_8:1/H-CHA | 95 | 94 | 85 | 75 | 63 |
| 2-15 | Pt/Pd_8:1/H-ZSM-5 | 98 | 96 | 85 | 74 | 62 |
| 2-16 | Pt/Pd_8:1/H-MOR | 98 | 89 | 77 | 62 | 47 |
| 2-17 | Pt/Pd_8:1/H-FER | 96 | 95 | 87 | 77 | 65 |
| 2-18 | Pt/Pd_8:1/$ZrO_2$ | 96 | 92 | 81 | 66 | 48 |
| 2-19 | Pt/Pd_8:1/$WO_3$/$TiO_2$ | 98 | 98 | 86 | 74 | 64 |
| 2-20 | Pt/Pd_4:1/H—Y | 98 | 98 | 98 | 92 | 85 |
| 2-21 | Pt/Pd_4:1/H-Beta | 9 | 33 | 64 | 98 | 98 |
| 2-22 | Pt/Pd_4:1/H-CHA | 98 | 93 | 76 | 57 | 40 |
| 2-23 | Pt/Pd_4:1/H-ZSM-5 | 98 | 98 | 81 | 67 | 58 |
| 2-24 | Pt/Pd_4:1/H-MOR | NA | NA | NA | NA | NA |
| 2-25 | Pt/Pd_4:1/H-FER | 91 | 92 | 84 | 74 | 62 |
| 2-26 | Pt/Pd_4:1/$ZrO_2$ | 98 | 94 | 86 | 73 | 55 |
| 2-27 | Pt/Pd_4:1/$WO_3$/$TiO_2$ | 98 | 98 | 88 | 78 | 72 |
| 2-28 | Pt/Pd_4:1/MgO | 5 | 19 | 36 | 55 | 85 |
| 2-29 | Pt/Pd_4:1/Mg—Al | 28 | 86 | 97 | 96 | 94 |
| 2-30 | Pt/Pd_2:1/H—Y | 90 | 98 | 98 | 92 | 85 |
| 2-31 | Pt/Pd_2:1/H-Beta | 13 | 35 | 69 | 98 | 95 |
| 2-32 | Pt/Pd_2:1/H-CHA | 98 | 95 | 67 | 46 | 39 |
| 2-33 | Pt/Pd_2:1/H-ZSM-5 | 98 | 98 | 75 | 63 | 59 |
| 2-34 | Pt/Pd_2:1/H-MOR | 98 | 90 | 69 | 57 | 54 |
| 2-35 | Pt/Pd_2:1/H-FER | 97 | 96 | 89 | 79 | 70 |
| 2-36 | Pt/Pd_2:1/$ZrO_2$ | 97 | 96 | 95 | 88 | 79 |
| 2-37 | Pt/Pd_2:1/$WO_3$/$TiO_2$ | 98 | 98 | 90 | 87 | 81 |
| 2-38 | Pd/H—Y | 47 | 88 | 90 | 89 | 87 |
| 2-39 | Pd/Beta | NA | NA | NA | NA | NA |
| 2-40 | Pd/H-CHA | NA | NA | NA | NA | NA |
| 2-41 | Pd/H-ZSM-5 | NA | NA | NA | NA | NA |
| 2-42 | Pd/H-MOR | 53 | 69 | 42 | 40 | 49 |
| 2-43 | Pd/H-FER | 28 | 58 | 66 | 76 | 79 |
| 2-44 | Pd/$ZrO_2$ | 96 | 89 | 89 | 83 | 77 |
| 2-45 | Pd/$WO_3$/$TiO_2$ | 97 | 96 | 95 | 93 | 89 |
| 2-46 | Pd/MgO | 2 | 8 | 10 | 14 | 31 |
| 2-47 | Pd/Mg—Al | 2 | 6 | 9 | 16 | 43 |

Figure 4:
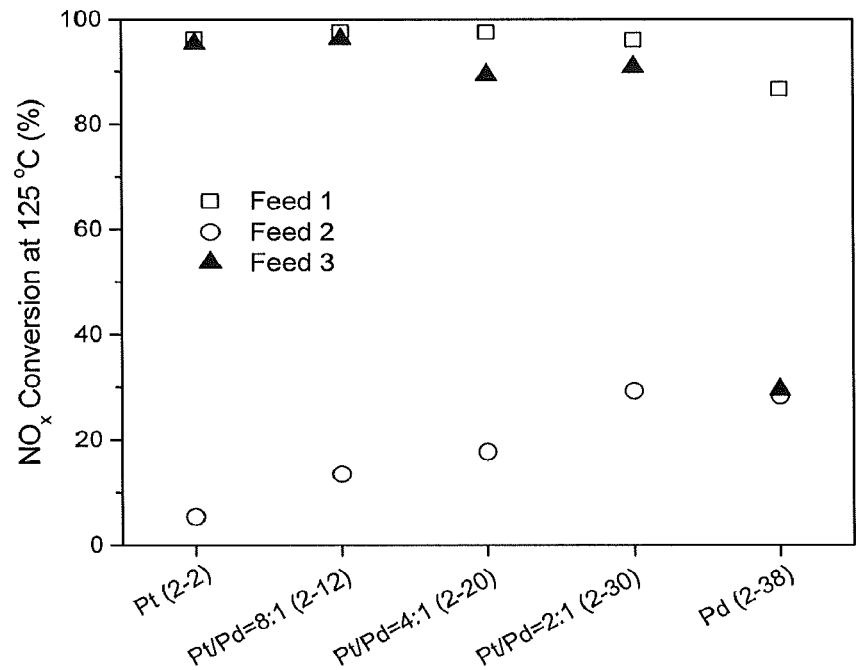
FIG. 4 shows the $NO_x$ conversion for several example embodiments of H—Y supported Pt/Pd catalysts at 125° C. at 1% $H_2$ as a function of feed condition and Pt/Pd ratio.

FIGS. 4-13 provide certain testing data for several of the above catalyst samples. In each figure, the Sample ID number is provided for each catalyst sample show in the figure. FIG. 4 shows the $NO_x$ conversion over H—Y supported Pt/Pd catalysts at 125° C. at 1% $H_2$ as a function of feed condition and Pt/Pd ratio. This figure illustrates the effect of CO addition and $C_3H_6$ addition on $NO_x$ conversion. With Feed 1 (no CO, no HC), the $NO_x$ conversions are very high (>90%) on all catalysts. Adding 500 ppm CO significantly decreases the $NO_x$ conversion, and the degree of decreases is linearly proportional to the Pt content up to Pt/Pd=2:1. On the other hand, addition of 100 ppm $C_3H_6$ shows a minimal decrease in $NO_x$ conversion for all Pt and Pt/Pd catalysts ($NO_x$ conversion >90%) but a drastic decrease on the Pd catalyst (conversion=30%).

Figure 5:
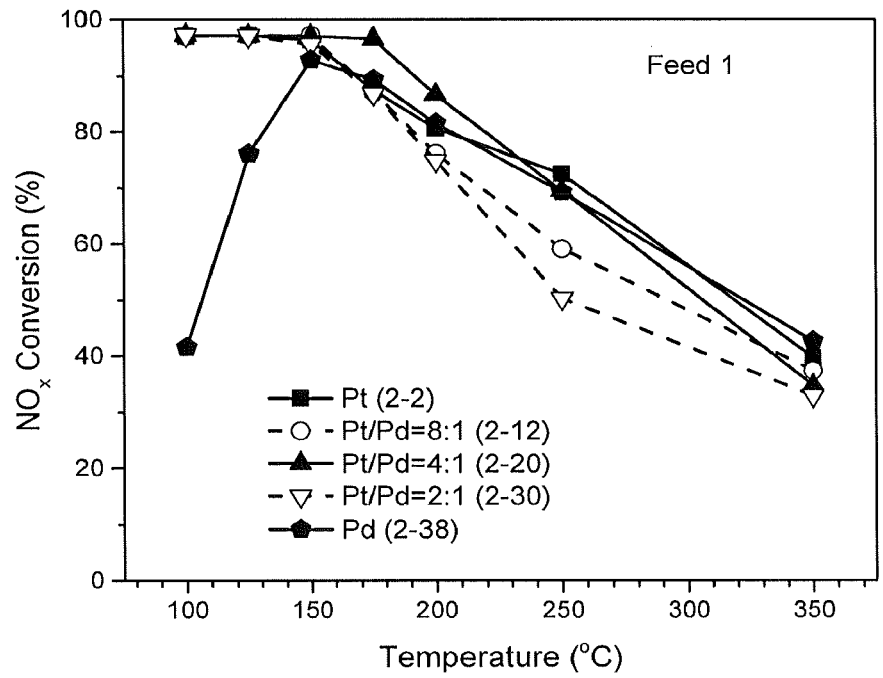
FIG. 5 shows the $NO_x$ conversion for several example embodiments of H—Y supported Pt/Pd catalysts as function of reaction temperature with Feed 1.
Figure 6:
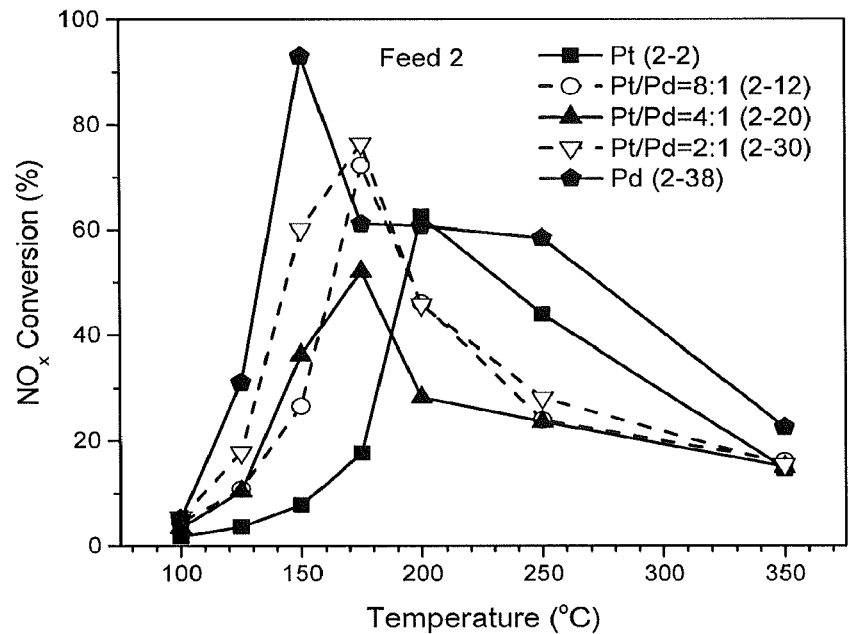
FIG. 6 shows the $NO_x$ conversion for several example embodiments of H—Y supported Pt/Pd catalysts as function of reaction temperature with Feed 2.
Figure 7:
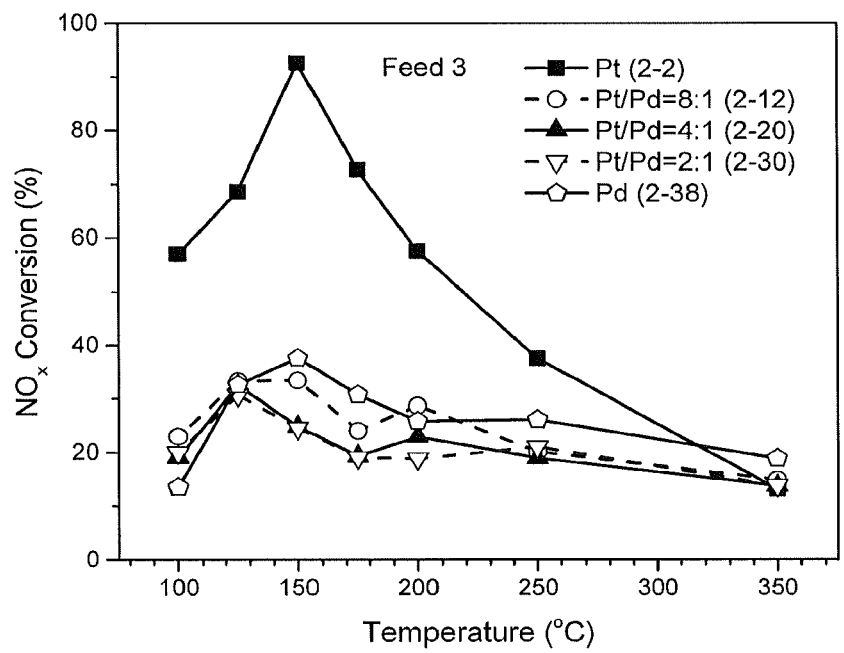
FIG. 7 shows the $NO_x$ conversion for several example embodiments of H—Y supported Pt/Pd catalysts as function of reaction temperature with Feed 3.

FIG. 5 shows the $NO_x$ conversion over H—Y supported Pt/Pd catalysts as function of reaction temperature with Feed 1. FIG. 6 shows the $NO_x$ conversion over H—Y supported Pt/Pd catalysts as function of reaction temperature with Feed 2. FIG. 7 shows the $NO_x$ conversion over H—Y supported Pt/Pd catalysts as function of reaction temperature with Feed 3.

Figure 8:
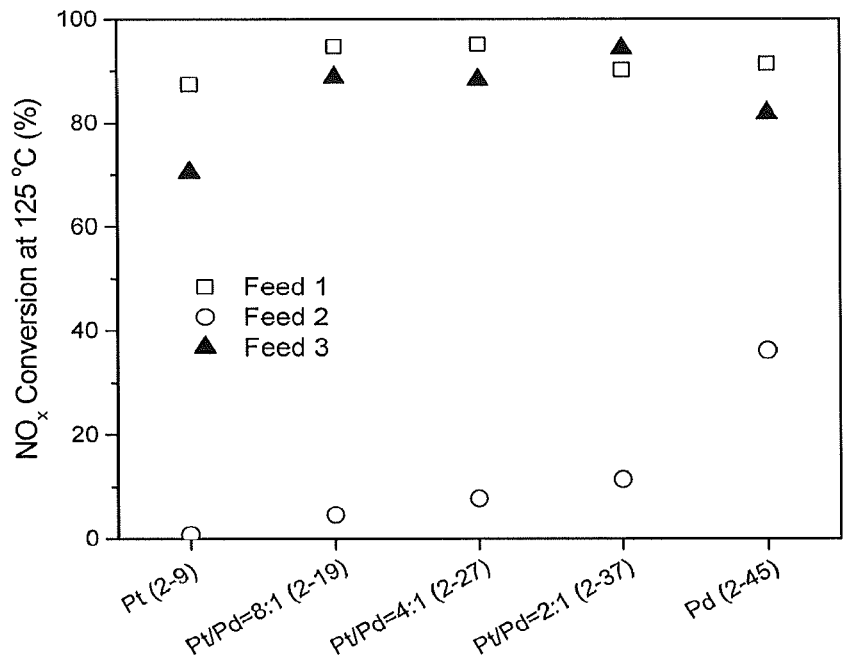
FIG. 8 shows the $NO_x$ conversion for several example embodiments of $WO_3/TiO_2$ supported Pt/Pd catalysts at 125° C. at 1% $H_2$ as a function of feed condition and Pt/Pd ratio.

FIG. 8 shows the $NO_x$ conversion over $WO_3/TiO_2$ supported Pt/Pd catalysts at 125° C. at 1% $H_2$ as a function of feed condition and Pt/Pd ratio. With Feed 1 (no CO, no HC), all $NO_x$ conversions are above 87%. Adding 500 ppm CO significantly decreases the $NO_x$ conversion on all Pt/Pd catalysts, but the decrease is less on the Pd catalyst. On the other hand, addition of 100 ppm $C_3H_6$ shows a minimal decrease in $NO_x$ conversion for all catalysts.

Figure 9:
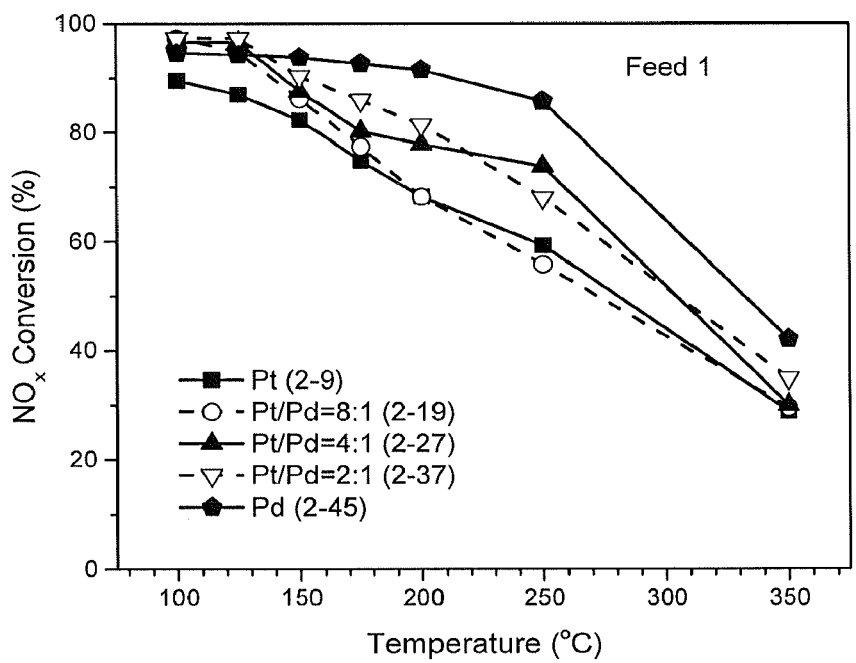
FIG. 9 shows the $NO_x$ conversion for several example embodiments of $WO_3/TiO_2$ supported Pt/Pd catalysts as function of reaction temperature with Feed 1.
Figure 10:
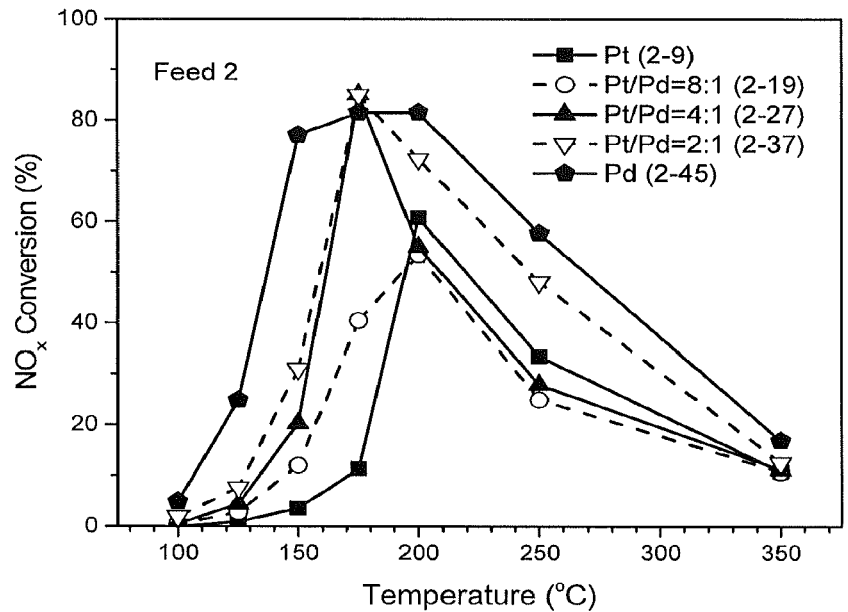
FIG. 10 shows the $NO_x$ conversion for several example embodiments of $WO_3/TiO_2$ supported Pt/Pd catalysts as function of reaction temperature with Feed 2.
Figure 11:
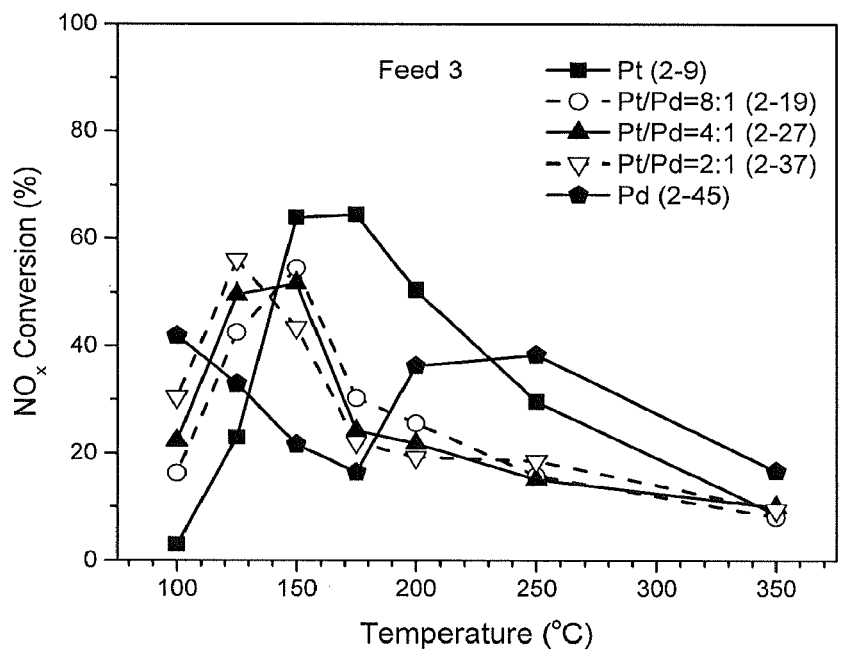
FIG. 11 shows the $NO_x$ conversion for several example embodiments of $WO_3/TiO_2$ supported Pt/Pd catalysts as function of reaction temperature with Feed 3.

FIG. 9 shows the $NO_x$ conversion over $WO_3/TiO_2$ supported Pt/Pd catalysts as function of reaction temperature with Feed 1. FIG. 10 shows the $NO_x$ conversion over $WO_3/TiO_2$ supported Pt/Pd catalysts as function of reaction temperature with Feed 2. FIG. 11 shows the $NO_x$ conversion over $WO_3/TiO_2$ supported Pt/Pd catalysts as function of reaction temperature with Feed 3.

Figure 12:
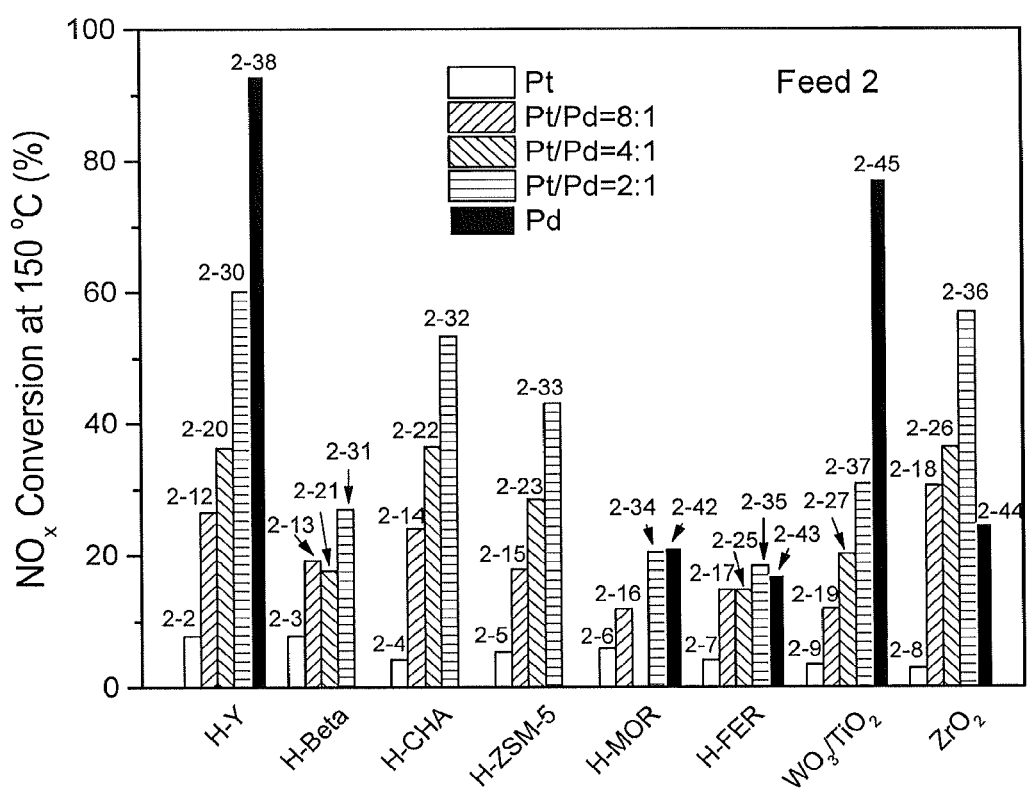
FIG. 12 shows the effect of CO on $NO_x$ conversion at 150° C. for several example embodiments.
Figure 13:
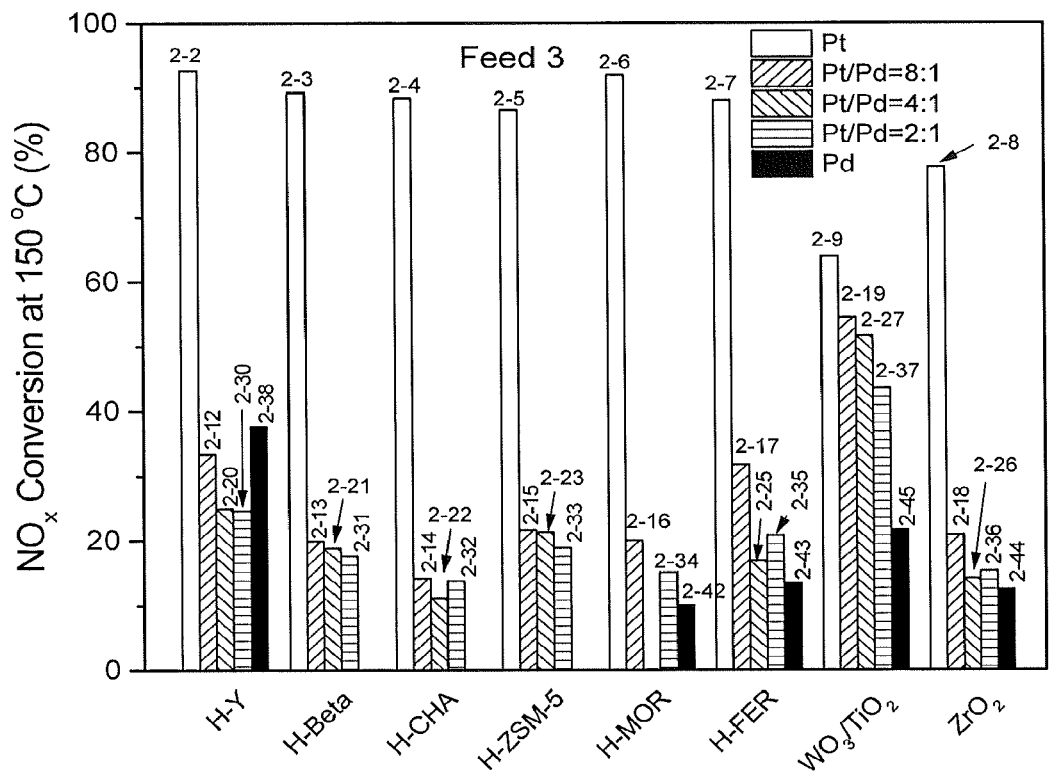
FIG. 13 shows the effect of $C_3H_6$ on $NO_x$ conversion at 150° C. for several example embodiments.

FIG. 12 shows the effect of CO on $NO_x$ conversion at 150° C. over a number of catalyst families. FIG. 13 shows the effect of $C_3H_6$ on $NO_x$ conversion at 150° C. over a number of catalyst families.

It is clear that CO has a more negative impact on Pt catalysts and Pt/Pd catalysts and less impact on Pd catalysts. On the other hand, HC has a less impact on Pt catalysts but more on Pd catalysts. Pd/H—Y is the best catalyst tested with a feed containing CO, while Pt/H—Y and Pt/H-MOR are the most active catalyst with a feed containing $C_3H_6$.

The use of the terms "a," "an," "the," and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the present disclosure. Thus, the appearances of the phrases such as "in one or more embodiments," "in certain embodiments," "in some embodiments," "in one embodiment," or "in an embodiment" in various places throughout this specification are not necessarily referring to the same embodiment of the present disclosure. Furthermore, the particular features, structures, materials, or characteristics may be combined in any suitable manner in one or more embodiments.

Although the embodiments disclosed herein have been described with reference to particular embodiments it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents, and the above-described embodiments are presented for purposes of illustration and not of limitation.

What is claimed is:

1. An emission treatment system for selectively reducing NOx compounds, the system comprising:
    a hydrogen generator; and
    an $H_2$-SCR catalytic article comprising a substrate and an $H_2$-SCR catalyst composition, the hydrogen generator being in fluid communication with, and upstream of, the $H_2$-SCR catalytic article;
    wherein the $H_2$-SCR catalyst composition comprises a platinum group metal component supported on a hydrogen form of zeolite or a metal oxide selected from zirconia, titania, magnesia, and combinations thereof; and
    a diesel oxidation catalyst (DOC) catalyst composition
    wherein the DOC catalyst composition is present in a layered catalyst coating on the $H_2$-SCR catalytic article with a bottom layer comprising the DOC catalyst composition and an upper layer comprising the $H_2$-SCR catalyst composition; and
    wherein the hydrogen generator is selected from the group consisting of on board hydrogen, hydrogen produced from alcohol reforming, hydrogen produced from ammonia decomposition, and combinations thereof.

2. The emission treatment system according to claim 1, further comprising a low temperature NOx adsorbent (LTNA) catalyst composition present in the layered catalytic coating.

3. The emission treatment system according to claim 1, further comprising a low temperature NOx adsorbent (LTNA) catalytic article comprising a substrate and a LTNA catalyst composition, the LTNA catalytic article in fluid communication with the $H_2$-SCR catalytic article and the hydrogen generator.

4. The emission treatment system according to claim 3, wherein the LTNA catalytic article is positioned downstream from the $H_2$-SCR catalytic article or positioned upstream from the $H_2$SCR catalytic article and the hydrogen generator.

5. The emission treatment system according to claim 3, wherein the $H_2$-SCR catalytic article is upstream of the LTNA catalytic article.

6. The emission treatment system according to claim 3, wherein the $H_2$-SCR catalytic article is downstream of the LTNA catalytic article.

7. The emission treatment system according to claim 1, further comprising a catalytic soot filter (CSF); a selective catalytic reduction (SCR) catalyst; an ammonia oxidation catalyst (AMOX); or combinations thereof.

8. The emission treatment system according to claim 7, wherein the SCR catalyst comprises a base metal-containing 8-ring small pore molecular sieve.

9. The emission treatment system according to claim 8, wherein the SCR catalyst comprises an iron and/or copper-containing 8-ring small pore molecular sieve.

10. The emission treatment system according to claim 9, wherein the molecular sieve is a zeolite having a structure selected from the group consisting of AEI, AFT, AFX, CHA, EAB, ERI, KFI, LEV, SAS, SAT, and SAV.

11. The emission treatment system according to claim 10, wherein the molecular sieve has a CHA crystal structure.

12. The emission treatment system according to claim 1, wherein the LNT catalyst composition comprises a NOx sorbent and a platinum group metal component dispersed on a refractory metal oxide support.

13. The emission treatment system according to claim 1, wherein the $H_2$-SCR catalytic article is close coupled.

14. The emission treatment system according to claim 1, wherein the platinum group metal component is platinum, palladium, or a combination thereof.

15. A method for treating an exhaust stream containing NOx, comprising passing the exhaust stream through the emission treatment system of claim 1.

16. The method according to claim 15, wherein the exhaust stream has a temperature that is about 200° C. or lower, about 175° C. or lower, about 150° C. or lower, about 125° C. or lower, or about 100° C. or lower.

17. A method for treating an exhaust stream containing NOx, comprising:
   introducing hydrogen gas into the exhaust stream to form a hydrogen-treated exhaust stream;
   passing the hydrogen-treated exhaust stream through an emission treatment system comprising
   an $H_2$SCR catalytic article comprising a substrate and an $H_2$SCR catalyst composition, wherein the $H_2$SCR catalyst composition comprises a platinum group metal component supported on a hydrogen form of zeolite or a metal oxide selected from zirconia, titania, magnesia, and combinations thereof; and
   a diesel oxidation catalyst (DOC) catalyst composition;
   wherein the DOC catalyst composition is present in a layered catalyst coating on the $H_2$-SCR catalytic article with a bottom layer comprising the DOC catalyst composition and an upper layer comprising the $H_2$-SCR catalyst composition; and
   wherein the hydrogen generator is selected from the group consisting of on board hydrogen, hydrogen produced from alcohol reforming, hydrogen produced from ammonia decomposition, and combinations thereof.

18. The method according to claim 17, wherein the platinum group metal component is platinum, palladium, or a combination thereof.

* * * * *